(12) United States Patent
Koike et al.

(10) Patent No.: US 8,662,726 B2
(45) Date of Patent: Mar. 4, 2014

(54) VEHICLE HEADLAMP INCLUDING TWO-DIMENSIONAL OPTICAL DEFLECTOR

(75) Inventors: Teruo Koike, Kanagawa (JP); Yoshiaki Yasuda, Kanagawa (JP)

(73) Assignee: Stanley Electric Co., Ltd., Tokyo (JP)

( * ) Notice: Subject to any disclaimer, the term of this patent is extended or adjusted under 35 U.S.C. 154(b) by 85 days.

(21) Appl. No.: 13/523,013

(22) Filed: Jun. 14, 2012

(65) Prior Publication Data

US 2012/0327678 A1    Dec. 27, 2012

(30) Foreign Application Priority Data

Jun. 22, 2011   (JP) .................................. 2011-138964

(51) Int. Cl.
*F21V 33/00* (2006.01)
(52) U.S. Cl.
USPC .......................................... 362/538; 362/277
(58) Field of Classification Search
USPC .......... 362/538, 539, 545, 507, 277, 326, 319
See application file for complete search history.

(56) References Cited

U.S. PATENT DOCUMENTS

| | | | |
|---|---|---|---|
| 2007/0019432 A1* | 1/2007 | Shimada | 362/545 |
| 2009/0046474 A1* | 2/2009 | Sato et al. | 362/466 |
| 2009/0257240 A1* | 10/2009 | Koike | 362/538 |
| 2011/0013412 A1* | 1/2011 | Kobayashi | 362/538 |

FOREIGN PATENT DOCUMENTS

JP        2009-48786 A      3/2009

* cited by examiner

*Primary Examiner* — Laura Tso
(74) *Attorney, Agent, or Firm* — Kenealy Vaidya LLP

(57) ABSTRACT

A headlamp for a vehicle includes a light source adapted to emit a spotlight, a lens adapted to receive and transmit the spotlight, a lens actuator adapted to adjust a size of the spotlight transmitted through the lens, a two-dimensional optical deflector adapted to deflect the spotlight from the lens to an illumination area ahead of the vehicle, and a control circuit configured to control the lens actuator in such a way that irregularity of illumination in the illumination area is avoided.

18 Claims, 25 Drawing Sheets

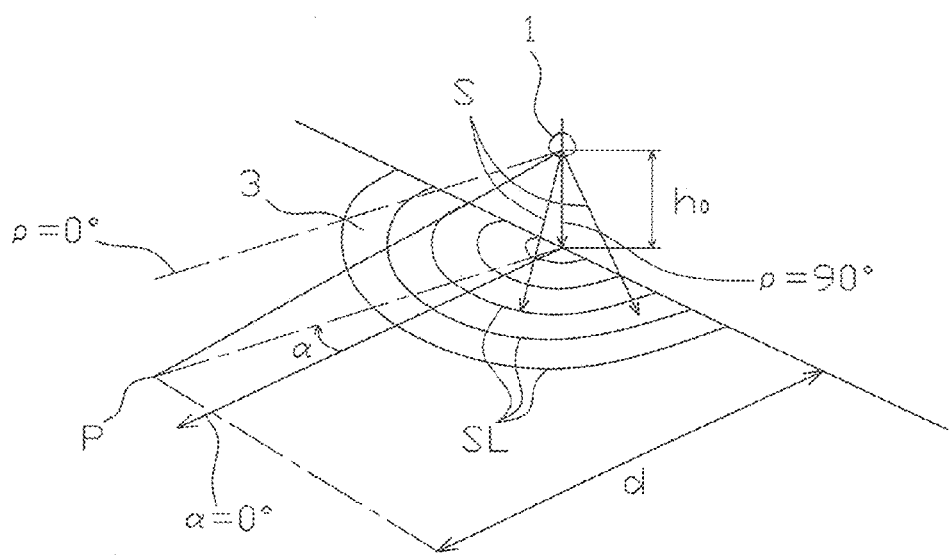

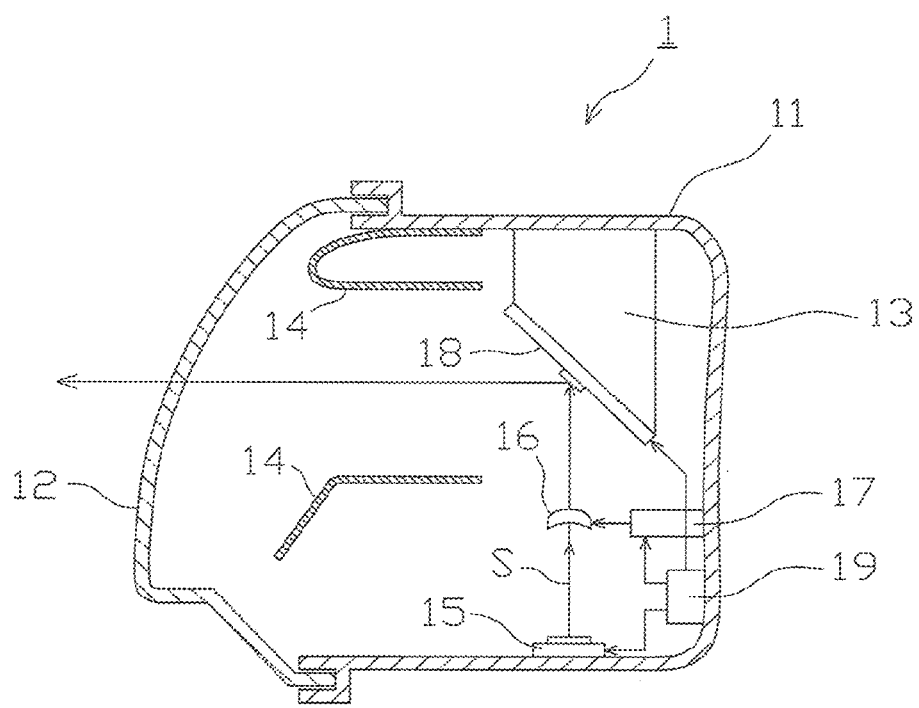

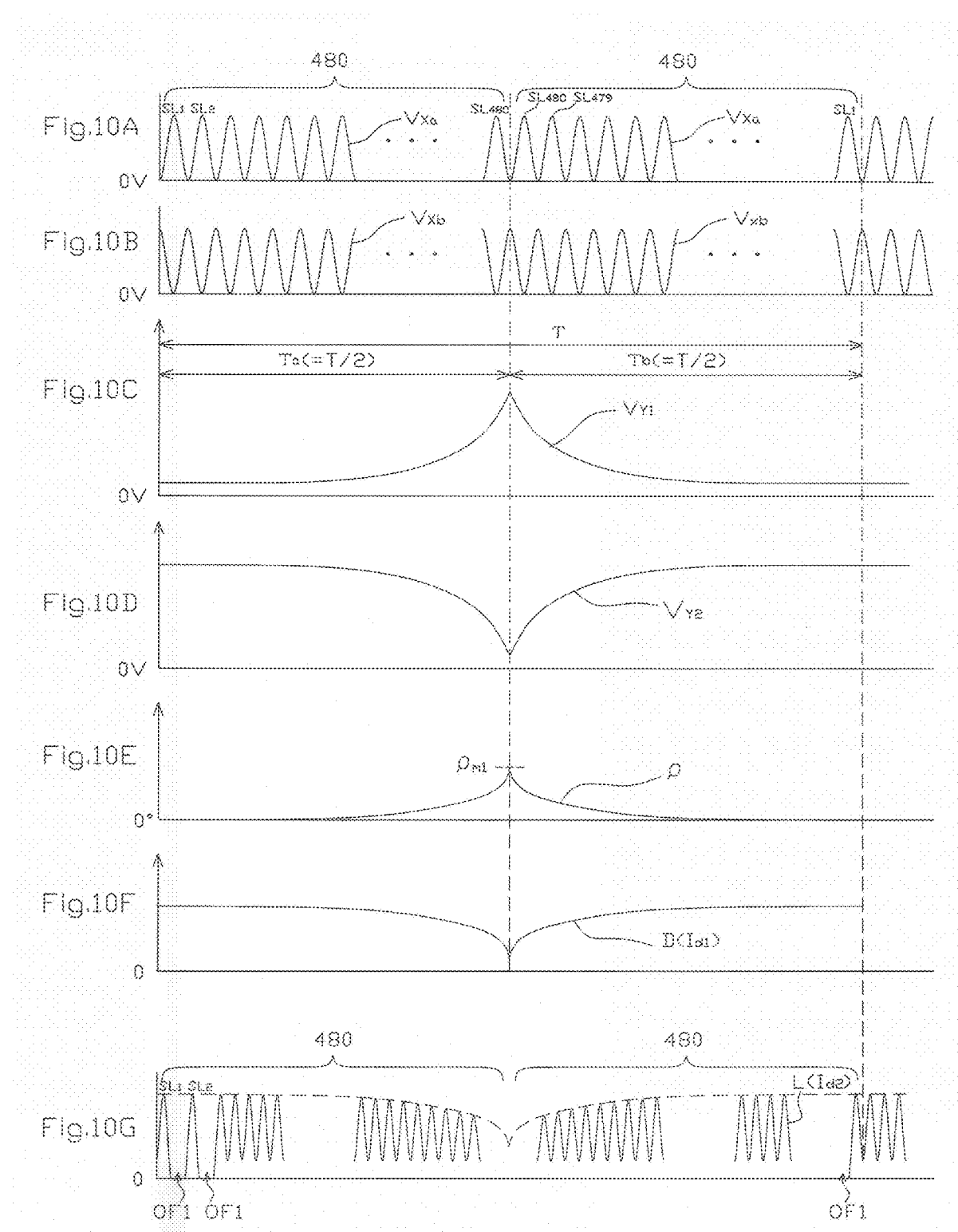

VEHICLE HEADLAMP INCLUDING TWO-DIMENSIONAL OPTICAL DEFLECTOR

This application claims the priority benefit under 35 U.S.C. §119 to Japanese Patent Application No. JP 2011-138964 filed on Jun. 22, 2011, which disclosure is hereby incorporated in its entirety by reference.

BACKGROUND

1. Field

The presently disclosed subject matter relates to a vehicle headlamp including a two-dimensional optical deflector.

2. Description of the Related Art

A prior art vehicle headlamp is constructed by a light source for emitting a light basic pattern (spotlight) and a two-dimensional optical deflector for reflecting the spotlight to ahead of a vehicle. The two-dimensional optical deflector includes a mirror for reflecting the spotlight from the light source, a movable frame surrounding the mirror for supporting the mirror, a first actuator for vibrating (rocking) the mirror with respect to an X-axis of the mirror, a support body surrounding the movable frame, and a second actuator for rocking the mirror through the movable frame with respect to a Y-axis of the mirror perpendicular to the X-axis. Thus, the two-dimensional rocking operation of the mirror is controlled to control a light distribution pattern (see: FIGS. 12, 13(a) and 13(b) of U.S. 2009/0046474A1 & JP 2009-48786A).

When an illumination area along a horizontal line and a vertical line ahead of the vehicle corresponding to the X-axis and Y-axis, respectively, of the mirror is raster-scanned with the spotlight by the two-dimensional optical deflector, a light distribution pattern which is relatively bright in the vicinity of a cut-off boundary line can be obtained. Note that the illumination area is set under the cut-off boundary line. In this case, the mirror is rocked with respect to the X-axis for a horizontal deflection at a high frequency by the first actuator, while the mirror is rocked with respect to the Y-axis for a vertical deflection at a low frequency by the second actuator. Therefore, the larger the distance from the two-dimensional optical deflector, the larger the density of scan lines depicted by the spotlight. As a result, regularity of illumination and better distant visibility may be obtained in the vicinity of the cut-off boundary line.

In the above-described prior art vehicle headlamp, however, since each of the scan lines in the vicinity of the cut-off boundary line would still be clearly observed as lines, irregularity of illumination would still occur in the vicinity of the cut-off boundary line.

Also, since the spotlight is scanned uniformly along the horizontal line, a bright center portion as required for the vehicle would not be realized.

SUMMARY

The presently disclosed subject matter seeks to solve one or more of the above-described problems.

According to the presently disclosed subject matter, a headlamp for a vehicle includes a light source adapted to emit a spotlight, a lens adapted to receive and transmit the spotlight, a lens actuator adapted to adjust a size of the spotlight transmitted through the lens, a two-dimensional optical deflector adapted to deflect the spotlight from the lens to an illumination area ahead of the vehicle, and a control circuit configured to control the lens actuator in such a way that irregularity of illumination in the illumination area is avoided.

Also, the control circuit is configured to control the lens actuator to change the size of the spotlight defining a line width of the scan lines in accordance with the second drive voltage. In this case, the closer to the cut-off boundary line one of the scan lines, the larger the line width of the one of the scan lines. Further, the control circuit is further configured to control the light source to change a luminance of the spotlight in accordance with the second drive voltage. In this case, the closer to the cut-off boundary line one of the scan lines, the larger the luminance of the spotlight depicting the one of the scan lines. Thus, a bright center portion can be realized in the horizontal line.

BRIEF DESCRIPTION OF THE DRAWINGS

The above and other advantages and features of the presently disclosed subject matter will be more apparent from the following description of certain embodiments, taken in conjunction with the accompanying drawings, wherein:

FIG. 2 is a diagram illustrating the detail of the scan lines depicted by the spotlight of FIGS. 1A and 1B;

FIG. 3 is a diagram illustrating an embodiment of the headlamp according to the presently disclosed subject matter;

FIGS. 10A, 10B, 10C, 10D, 10E, 10F and 10G are timing diagrams for explaining the low-beam operation of the control circuit of FIG. 7;

DETAILED DESCRIPTION OF EXEMPLARY EMBODIMENTS

Figure 1A:
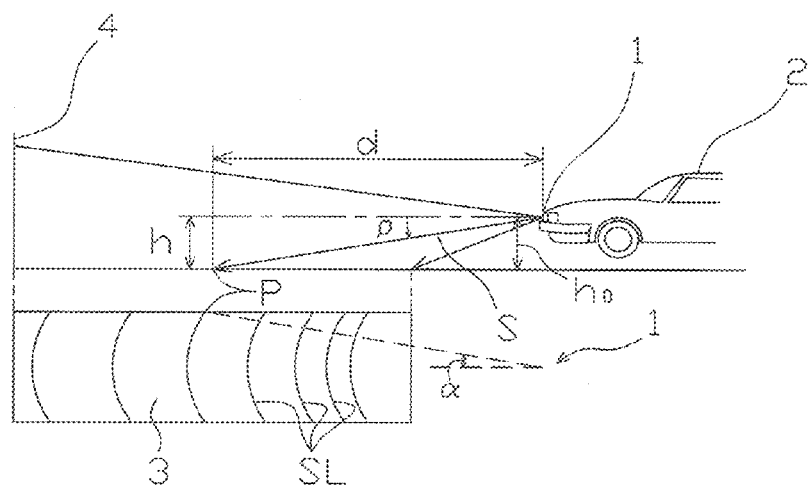
FIGS. 1A and 1B are a side view and a perspective view, respectively, illustrating an illumination area ahead of a vehicle.
Figure 1B:
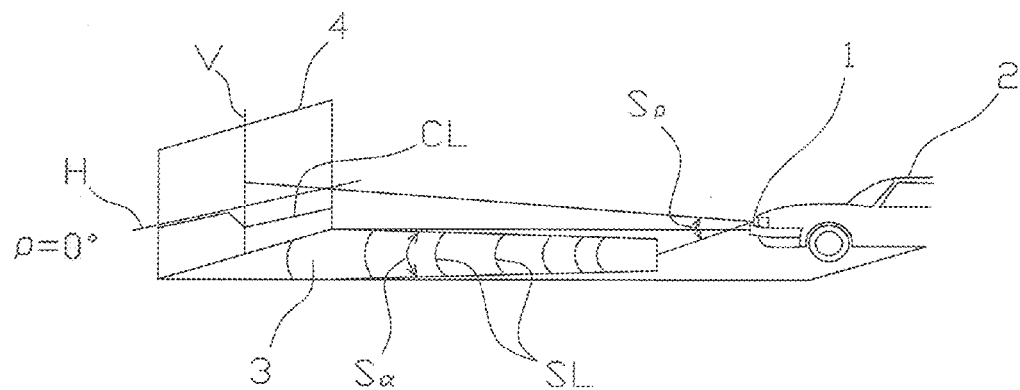

In FIGS. 1A and 1B, which are a side view and a perspective view, respectively, illustrating an illumination area ahead of a vehicle, a headlamp 1 located at a height "$h_0$" such as 0.75 m of a vehicle 2 irradiates a road illumination area 3 and a spatial illumination area 4 ahead of the vehicle 2. Note that the spatial illumination area 4 is represented by a virtual screen installed at the farthest end of the road illumination area 3 from the headlamp 1.

Also, two headlamps are usually provided on the vehicle 2; however, since each one headlamp can be operated to control an arbitrary light distribution pattern, only one headlamp is illustrated.

In FIG. 1A, an illumination point P is defined by a distance "d" and a height "h" with respect to the headlamp 1. In this case, an inclination angle ρ of a spotlight S from the headlamp 1 to the illumination point P with respect to the horizontal plane at the height "$h_0$" is represented by $$\rho = \tan^{-1}(h/d)$$

where "h" is positive when the illumination point P is below the horizontal plane at the height "$h_0$" and negative when the illumination point P is over the horizontal plane at the height "$h_0$". For example, when the illumination point P is on the horizontal plane at the height "$h_0$", ρ is 0°. Also, when the illumination point P is immediately below the headlamp 1, ρ is 90°.

In FIG. 1A, when the road illumination area 3 and the spatial illumination area 4 are raster-scanned with the spotlight S, a plurality of scan lines SL are generated due to the movement of the illumination point P.

In FIG. 1B, $S_\alpha$ designates a control range of the deflection angle α of the illumination point P, and $S_\rho$ designates a control range of the inclination angle ρ.

Also, in FIG. 1B, a vertical line V and a horizontal line H are defined on the spatial illumination area 4. In this case, the position of the vertical line V corresponds to the center line of a traffic lane on which the vehicle 2 is travelling, while the position of the horizontal line H corresponds to the position of the horizontal plane at the height "$h_0$".

In FIG. 2, which illustrates the detail of the scan lines SL of the spotlight S of FIGS. 1A and 1B, when the inclination angle ρ of the illumination point P is gradually changed and the deflection angle α of the illumination point P is rapidly changed, a plurality of circular scan lines SL centered at a position immediately below the headlamp 1 are depicted by the illumination point P. For example, the deflection angle α is 0° when the illumination point P is immediately ahead of the headlamp 1, i.e., towards the vertical line V; the deflection angle α is positive when the illumination point P is on the right side with respect to the vertical line V; and the deflection angle α is negative when the illumination point P is on the left side with respect to the vertical line V.

In FIG. 3, which illustrates an embodiment of the headlamp according to the presently disclosed subject matter, the headlamp 1 is constructed by a housing 11, a transparent cover 12 covering an opening of the housing 11, a bracket 13 fixed at the housing 11, an extension 14 disposed between the transparent cover 12 and the bracket 13, a light source 15 including a white-color light emitting diode (LED) fixed at the housing 11 for emitting a spotlight S, a lens 16 for receiving and transmitting the spotlight S, a lens actuator 17 for adjusting the size (diameter) D of the spotlight S transmitted through the lens 16, a two-dimensional optical deflector 18 fixed at the bracket 13 for receiving the spotlight S whose size was adjusted by the lens actuator 17 to deflect the spotlight S, and a control circuit 19 for controlling the light source 15, the lens actuator 17 and the optical deflector 18.

The lens 16 is a convergence lens formed by a convex lens and also can serve as a collimating lens.

Figure 4:
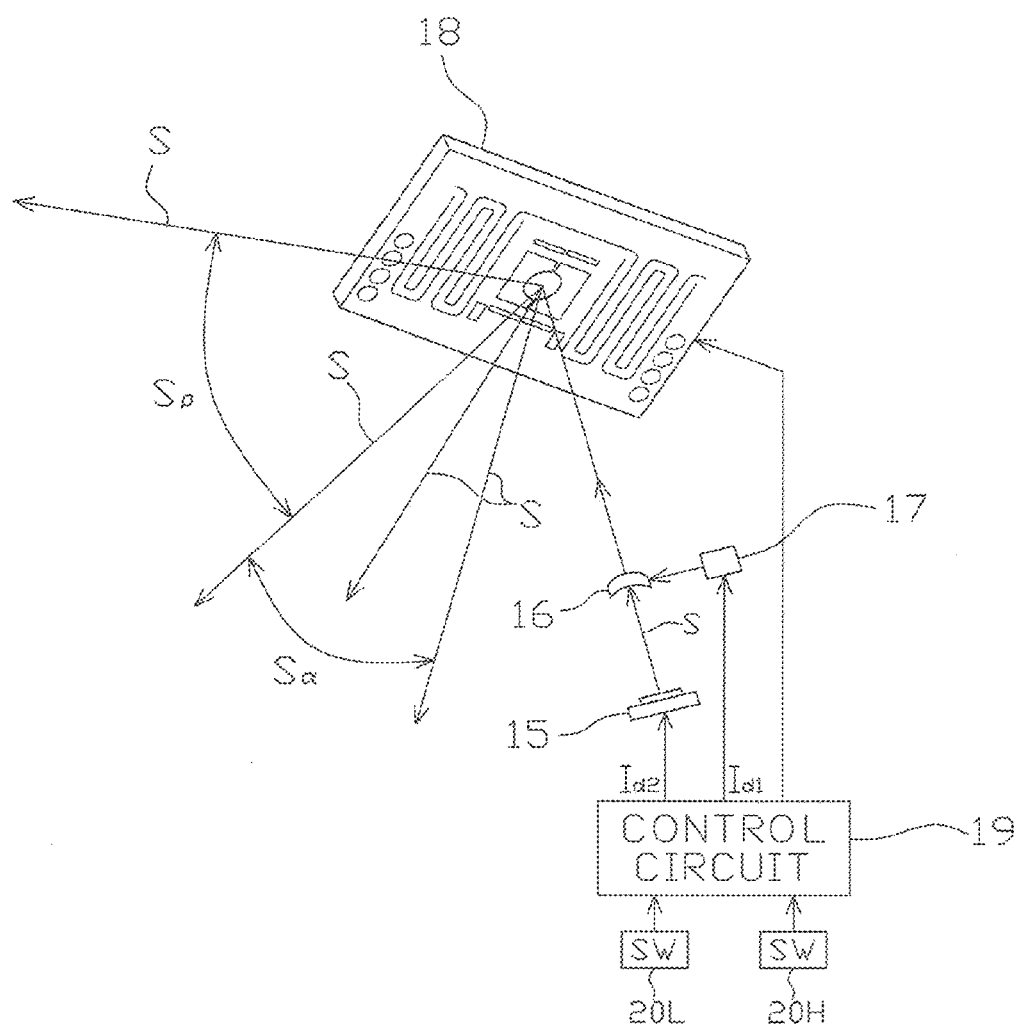
FIG. 4 is a diagram illustrating the principal portions of FIG. 3.

In FIG. 4, which illustrates the principal portions of FIG. 3, in accordance with the output signals of a low-beam switch 20L and a high-beam switch 20H, the control circuit 19 controls the piezoelectric actuators of the optical deflector 18 to control the deflection of the spotlight S. Also, the control circuit 19 supplies a drive current $I_{d1}$ to the lens actuator 17 to control the size (diameter) D of the spotlight S, and supplies a drive current $I_{d2}$ to the light source 15 to control the luminance L thereof. This will be explained in detail later.

Figure 5:
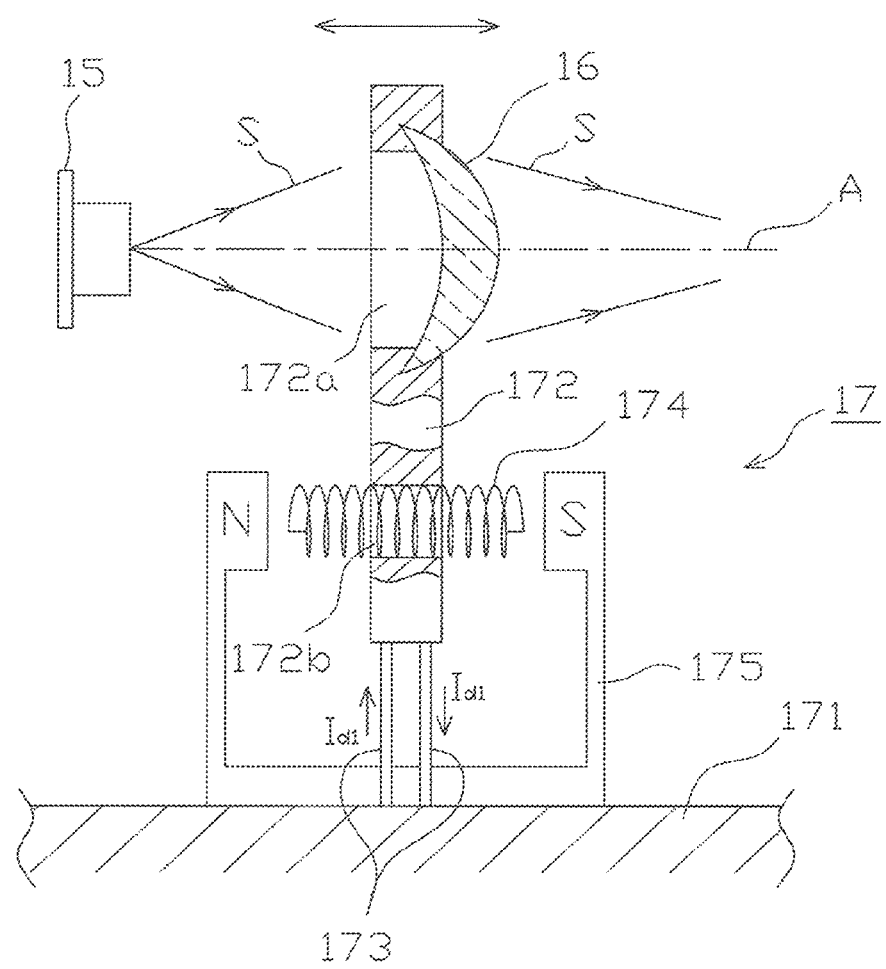
FIG. 5 is a detailed diagram of the lens actuator of FIGS. 3 and 4.

In FIG. 5, which is a detailed diagram of the lens actuator 17 of FIGS. 3 and 4, the lens actuator 17 is constructed by a frame 171 which is mounted directly or indirectly on the housing 11 of FIG. 3 and a holder 172 supported by a plurality of filament springs such as two or four filament springs 173 to the frame 171 in such a manner that the holder 172 is perpendicular to the optical axis A of the spotlight S from the light source 15 in a non-operation state.

Two cylindrical holes 172a and 172b whose axial directions are in parallel with the optical axis A of the spotlight S are perforated in the holder 172.

The lens 16 is fixed in the cylindrical hole 172a in such a manner that the center axis of the lens 16 coincides with the optical axis A of the spotlight S.

A winding 174 is fixed in the cylindrical hole 172b in such a manner that the center axis of the winding 174 coincides with the optical axis A of the spotlight S. In this case, in order to enhance the magnetic force of the winding 174, an iron core can be inserted into the winding 174. The ends of the winding 174 are electrically connected to the filament springs 173.

A yoke 175 is fixed at the frame 171, and has an N-pole and an S-pole opposing the ends of the winding 174.

The winding 174 increases or decreases the repulsive force or attractive force against the magnetic force of the yoke 175. That is, when the current $I_{d1}$ is supplied via the filament springs 173 to the ends of the winding 174, the winding 174 generates magnetic poles at its ends whose strength is in relation to the current $I_{d1}$. Thus, the distance between the light source 15 and the lens 16, i.e., the size D of the spotlight S is adjusted in accordance with the current $I_{d1}$. In this case, when no current is supplied to the winding 174, the holder 172 is stably located at a gap center of the yoke 175, in such a way that the distance between the light source 15 and the lens 16 is a focal length thereof.

The holder 172 is displaced by a displacement as indicated by arrows along the optical axis A of the spotlight S in accordance with the repulsive force or attractive force of the winding 174 against the magnetic poles N and S of the yoke 175 and the spring forces of the filament springs 173.

When the holder 172 is displaced by the displacement as indicated by arrows, the distance between the light source 15 and the lens 16 is also displaced. Therefore, when the current $I_{d1}$ supplied to the filament springs 173 is changed, the size (diameter) D of the spotlight S transmitted through the lens 16 is changed as illustrated in FIG. 6.

Figure 6:
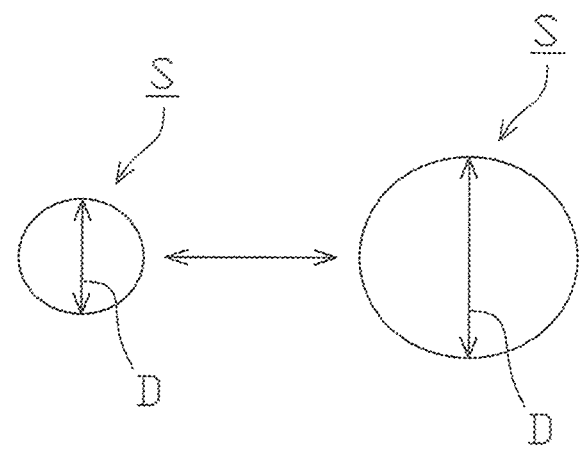
FIG. 6 is a diagram explaining the size of the spotlight adjusted by the lens actuator of FIG. 5.

Note that the spotlight S deflected by the optical deflector 18 is still circular as illustrated in FIG. 6; however, the spotlight S that reaches the road illustration area 3 of FIGS. 1A and 1B is actually ellipsoidal due to the fact that the road illustration area 3 is sloped with respect to the optical axis A of the spotlight S.

Figure 7:
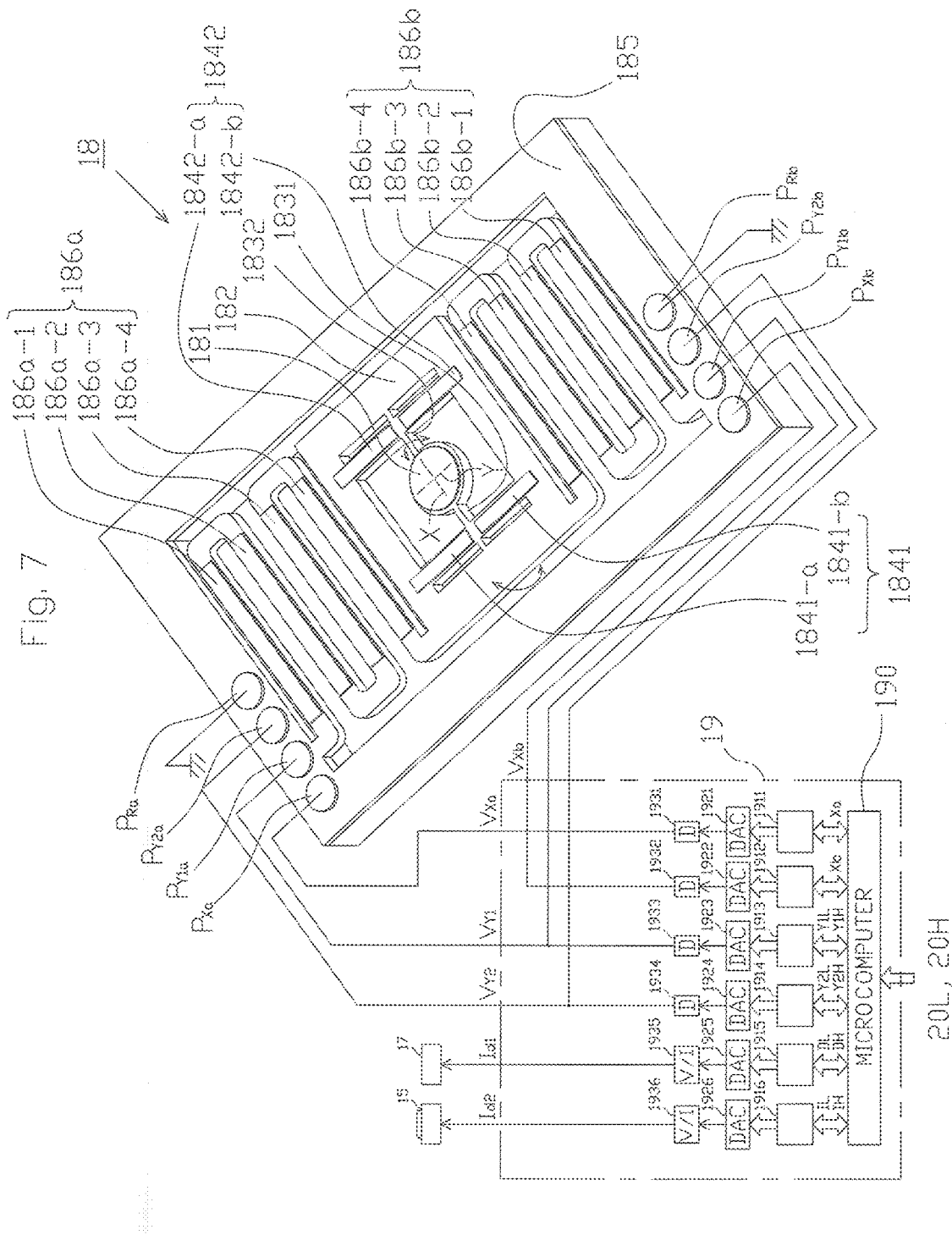
FIG. 7 is a detailed diagram of a first example of the optical deflector and the control circuit of FIGS. 3 and 4.

FIG. 7 is a detailed diagram of a first example of the optical deflector 18 and the control circuit 19 of FIGS. 3 and 4.

The optical deflector 18 is constructed by a circular mirror 181 for reflecting the spotlight S from the lens 16 of FIGS. 3 and 4, a movable frame 182 surrounding the mirror 181 for supporting the mirror 181 through a pair of torsion bars 1831 and 1832, a pair of inner piezoelectric actuators (first piezoelectric actuators) 1841 and 1842 of a torsion-bar type fixed between the movable frame 182 and the torsion bars 1831 and 1832 and serving as cantilevers for rocking the mirror 181 through the torsion bars 1831 and 1832 with respect to an X-axis of the mirror 181, a support body 185 surrounding the movable frame 182, and a pair of outer piezoelectric actuators (second piezoelectric actuators) 186a and 186b of a meander-type fixed between the support body 185 and the movable frame 182 and serving as cantilevers for rocking the mirror 181 through the movable frame 182 with respect to a Y-axis of the mirror 181 perpendicular to the X-axis.

The torsion bars 1831 and 1832 are arranged along the X-axis, and have ends coupled to the inner circumference of the movable frame 182 and other ends coupled to the outer circumference of the mirror 181. Therefore, the torsion bars 1831 and 1832 are twisted by the inner piezoelectric actuators 1841 and 1842 to rock the mirror 181 with respect to the X-axis.

The inner piezoelectric actuator 1841 is constructed by piezoelectric cantilevers 1841-a and 1841-b which oppose each other along the Y-axis and sandwich the torsion bar 1831. The piezoelectric cantilevers 1841-a and 1841-b have ends coupled to the inner circumference of the movable frame 182 and other ends coupled to the torsion bar 1831. In this case, the flexing direction of the piezoelectric cantilever 1841-a is opposite to that of the piezoelectric cantilever 1841-b.

Similarly, the inner piezoelectric actuator 1842 is constructed by piezoelectric cantilevers 1842-a and 1842-b which oppose each other along the Y-axis and sandwich the torsion bar 1832. The piezoelectric cantilevers 1842-a and 1842-b have ends coupled to the inner circumference of the movable frame 182 and other ends coupled to the torsion bar 1832. In this case, the flexing direction of the piezoelectric cantilever 1842-a is opposite to that of the piezoelectric cantilever 1842-b.

The support body 185 is rectangularly-framed to surround the movable frame 182.

The outer piezoelectric actuator 186a and 186b are constructed by piezoelectric cantilevers 186a-1, 186a-2, 186a-3 and 186a-4; and 186b-1, 186b-2, 186b-3 and 186b-4, and are coupled between the inner circumference of the support body 185 and the outer circumference of the movable frame 182, in order to rock the movable frame 182 associated with the mirror 181 with respect to the support body 185, i.e., to rock the mirror 181 with respect to the Y-axis.

The piezoelectric cantilevers 186a-1, 186a-2, 186a-3 and 186a-4 are serially-coupled from the support body 185 to the movable frame 182. Also, each of the piezoelectric cantilevers 186a-1, 186a-2, 186a-3 and 186a-4 are in parallel with the X-axis of the mirror 181. Therefore, the piezoelectric cantilevers 186a-1, 186a-2, 186a-3 and 186a-4 are folded at every cantilever or meandering from the support body 185 to the movable frame 182, so that the amount of flexing of the piezoelectric cantilevers 186a-1, 186a-2, 186a-3 and 186a-4 can be changed along directions perpendicular to the Y-axis of the mirror 181.

Similarly, the piezoelectric cantilevers 186b-1, 186b-2, 186b-3 and 186b-4 are serially-coupled from the support body 185 to the movable frame 182. Also, each of the piezoelectric cantilevers 186b-1, 186b-2, 186b-3 and 186b-4 are in parallel with the X-axis of the mirror 181. Therefore, the piezoelectric cantilevers 186b-1, 186b-2, 186b-3 and 186b-4 are folded at every cantilever or meandering from the support body 185 to the movable frame 182, so that the amount of flexing of the piezoelectric cantilevers 186b-1, 186b-2, 186b-3 and 186b-4 can be changed along directions perpendicular to the Y-axis of the mirror 181.

Provided on the optical deflector 18 are pads $P_{Xa}$, $P_{Y1a}$, $P_{Y2a}$ and $P_{Ra}$; and $P_{Xb}$, $P_{Y1b}$, $P_{Y2b}$ and $P_{Rb}$. The pads $P_{Xa}$, $P_{Y1a}$, $P_{Y2a}$, $P_{Xb}$, $P_{Y1b}$ and $P_{Y2b}$ are connected to the control circuit 19.

Figure 8:
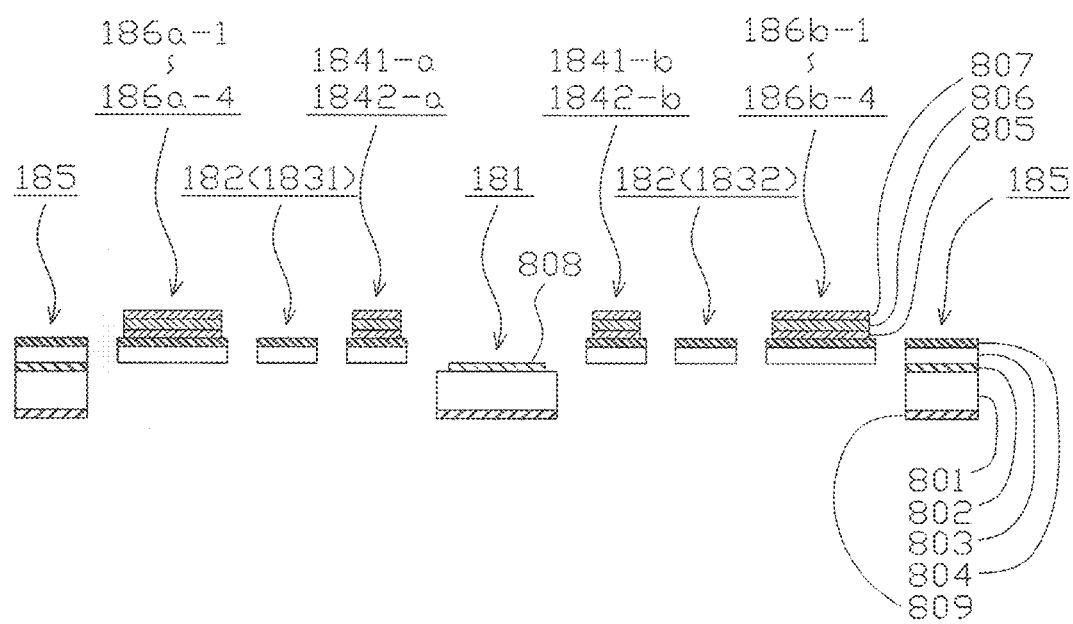
FIG. 8 is a cross-sectional view of the optical deflector of FIG. 7.

The pad $P_{Xa}$ is connected to the upper electrode layer 807 (see: FIG. 8) of each of the piezoelectric cantilevers 1841-a and 1842-a. Also, the pad $P_{Y1a}$ is connected to the upper electrode layer 807 (see: FIG. 8) of each of the odd-numbered piezoelectric cantilevers 186a-1 and 186a-3, and the pad $P_{Y2a}$ is connected to the upper electrode layer 807 (see: FIG. 8) of each of the even-numbered piezoelectric cantilevers 186a-2 and 186a-4. Further, the pad $P_{Ra}$ is connected via via-plugs (not shown) to the lower electrode layer 805 (see: FIG. 8) of each of the piezoelectric cantilevers 1841-a, 1842-a, 186a-1, 186a-2, 186a-3 and 186a-4. In this case, the pad $P_{Ra}$ is grounded, i.e., a reference voltage at the pad $P_{Ra}$ is 0 V.

On the other hand, the pad $P_{Xb}$ is connected to the upper electrode layer 807 (see: FIG. 8) of each of the piezoelectric cantilevers 1841-b and 1842-b. Also, the pad $P_{Y1b}$ is connected to the upper electrode layer 807 (see: FIG. 8) of each of the odd-numbered piezoelectric cantilevers 186b-1 and 186b-3, and the pad $P_{Y2b}$ is connected to the upper electrode layer 807 (see: FIG. 8) of each of the even-numbered piezoelectric cantilevers 186b-2 and 186b-4. Further, the pad $P_{Rb}$ is connected via via-plugs (not shown) to the lower electrode layer 805 (see: FIG. 8) of each of the piezoelectric cantilevers 1841-b, 1842-b, 186b-1, 186b-2, 186b-3 and 186b-4. Also, in this case, the pad $P_{Rb}$ is grounded, i.e., a reference voltage at the pad $P_{Rb}$ is 0 V.

The control circuit 19 is constructed by a microcomputer 190 including a central processing unit (CPU), a read-only memory (ROM), a random access memory (RAM), an input/output (I/O) interface and the like.

The control circuit 19 further includes a nonvolatile memory 1911 for storing drive data Xa for driving the upper electrode layers of the piezoelectric cantilevers 1841-a and 1842-a, a digital-to-analog converter (DAC) 1921 for converting the drive data Xa into a sinusoidal-wave drive voltage $V_{Xa}$, and a drive circuit 1931 for applying the sinusoidal-wave drive voltage $V_{Xa}$ to the pad $P_{Xa}$.

The control circuit 19 further includes a nonvolatile memory 1912 for storing drive data Xb for driving the upper electrode layers of the piezoelectric cantilevers 1841-*b* and 1842-*b*, a digital-to-analog converter (DAC) 1912 for converting the drive data Xb into a sinusoidal-wave drive voltage $V_{Xb}$, and a drive circuit 1932 for applying the sinusoidal-wave drive voltage $V_{Xb}$ to the pad $P_{Xb}$.

The control circuit 19 further includes a nonvolatile memory 1913 for storing low-beam drive data Y1L and high-beam drive data Y1H for driving the upper electrode layers of the odd-numbered piezoelectric cantilevers 186*a*-1, 186*a*-3, 186*b*-1 and 186*b*-3, a digital-to-analog converter (DAC) 1923 for converting one of the drive data Y1L and Y1H into a curved-type saw-tooth drive voltage $V_{Y1}$, and a drive circuit 1933 for applying the curved-type saw-tooth drive voltage $V_{Y1}$ to the pads $P_{Y1a}$ and $P_{Y1b}$.

The control circuit 19 further includes a nonvolatile memory 1914 for storing low-beam drive data Y2L and high-beam drive data Y2H for driving the upper electrode layers of the even-numbered piezoelectric cantilevers 186*a*-2, 186*a*-4, 186*b*-2 and 186*b*-4, a digital-to-analog converter (DAC) 1924 for converting one of the drive data Y2L and Y2H into a curved-type saw-tooth drive voltage $V_{Y2}$, and a drive circuit 1934 for applying the curved-type saw-tooth drive voltage $V_{Y2}$ to the pads $P_{Y2a}$ and $P_{Y2b}$.

The control circuit 19 further includes a nonvolatile memory 1915 for storing low-beam scan line size data DL and high-beam scan line size data DH for driving the lens actuator 17, a digital-to-analog converter (DAC) 1925 for converting one of the scan line size data DL and DH into an analog drive voltage, and a voltage-to-current conversion circuit 1925 for supplying an analog drive current $I_d$ corresponding to the analog drive voltage of the digital-to-analog converter 1925 to the filament springs 173 of the lens actuator 17.

The control circuit 19 further includes a nonvolatile memory 1916 for storing low-beam scan line intensity data IL and high-beam scan line intensity data IH for driving the light source 15, a digital-to-analog converter (DAC) 1926 for converting one of the scan line intensity data IL and IH into an analog drive voltage, and a voltage-to-current conversion circuit 1926 for supplying an analog drive current $I_{d2}$ corresponding to the analog drive voltage of the digital-to-analog converter 1926 to the light source 15.

Note that the number of the piezoelectric cantilevers 186*a*-1, 186*a*-2, 186*a*-3 and 186*a*-4 and the number of the piezoelectric cantilevers 186*b*-1, 186*b*-2, 186*b*-3 and 186*b*-4 can be other values such as 2, 6, 8, . . . .

The structure of each element of the optical deflector 18 is explained next with reference to FIG. 8.

In FIG. 8, a monocrystalline silicon support layer 801, an intermediate silicon oxide layer 802 and a monocrystalline silicon active layer 803 are formed by a silicon-on-insulator (SOI) substrate. Also, reference numeral 804 designates a silicon oxide layer, 805 designates a lower electrode layer made of Pt, Au or the like, 806 designates a lead titanate zirconate (PZT) layer, 807 designates an upper electrode layer made of Pt, Au or the like, 808 designates a metal layer made of Al, Ag or the like, and 809 designates a hard mask layer made of silicon oxide or the like.

The mirror 181 is constructed by the monocrystalline silicon support layer 801 serving as a vibration plate, the metal layer 808 serving as a reflector and the hard mask layer 809.

The movable frame 182 and the torsion bars 1831 and 1832 are constructed by the monocrystalline silicon active layer 803 and the silicon oxide layer 804.

The piezoelectric cantilevers 1841-*a*, 1842-*a*, 1841-*b* and 1842-*b*, 186*a*-1 to 186*a*-4 and 186*b*-1 to 186*b*-4 are constructed by the monocrystalline silicon active layer 803, the silicon oxide layer 804, the lower electrode layer 805, the PZT layer 806 and the upper electrode layer 807.

The support body 185 is constructed by the monocrystalline silicon layer 801, the intermediate silicon layer 802, the monocrystalline silicon active layer 803, the silicon oxide layer 804 and the hard mask layer 809.

The pads $P_{Xa}$, $P_{Y1a}$, $P_{Y2a}$ and $P_{Ra}$, $P_{Xb}$, $P_{Y1b}$, $P_{Y2b}$ and $P_{Rb}$ are constructed by another electrode layer.

First, an optical deflection or horizontal scanning operation by rocking the mirror 181 with respect to the X-axis using the inner piezoelectric actuators 1841 and 1842 is explained briefly below.

That is, a sinusoidal-wave drive voltage $V_{Xa}$ based upon the drive data Xa stored in advance in the nonvolatile memory 1911 and a sinusoidal-wave drive voltage $V_{Xb}$ based upon the drive data Xb stored in advance in the nonvolatile memory 1912 are sinusoidal at a predetermined frequency and symmetrical or opposite in phase to each other with the reference voltage 0 V. As a result, the piezoelectric cantilevers 1841-*a* and 1842-*a* and the piezoelectric cantilevers 1841-*b* and 1842-*b* carry out flexing operations in opposite directions to each other, so that the torsion bars 1831 and 1832 are twisted to rock the mirror 181 with respect to the X-axis.

In the optical deflection or horizontal scanning operation by rocking the mirror 181 with respect to the X-axis, the inner piezoelectric actuator 1841 and 1842 are of a resonant type. Therefore, if the frequency of the sinusoidal-wave drive voltages $V_{Xa}$ and $V_{Xb}$ resonates with the natural frequency of a mechanically-vibrating system of the mirror 181 with respect to the X-axis depending upon the piezoelectric cantilevers 1841-*a*, 1842-*a*, 1841-*b* and 1842-*b*, the deflection angle of the mirror 181 can be increased.

Next, an optical deflection or vertical scanning operation by rocking the mirror 181 with respect to the Y-axis using the outer piezoelectric actuators 186*a* and 186*b* is explained briefly below.

The piezoelectric cantilevers 186*a*-1, 186*a*-2, 186*a*-3, 186*a*-4, 186*b*-1, 186*b*-2, 186*b*-3 and 186*b*-4 are divided into an odd-numbered group of the piezoelectric cantilevers 186*a*-1 and 186*a*-3; 186*b*-1 and 186*b*-3, and an even-numbered group of the piezoelectric cantilevers 186*a*-2 and 186*a*-4; 186*b*-2 and 186*b*-4 alternating with the odd-numbered group of the piezoelectric cantilevers 186*a*-1 and 186*a*-3; 186*b*-1 and 186*b*-3.

Figure 9A:
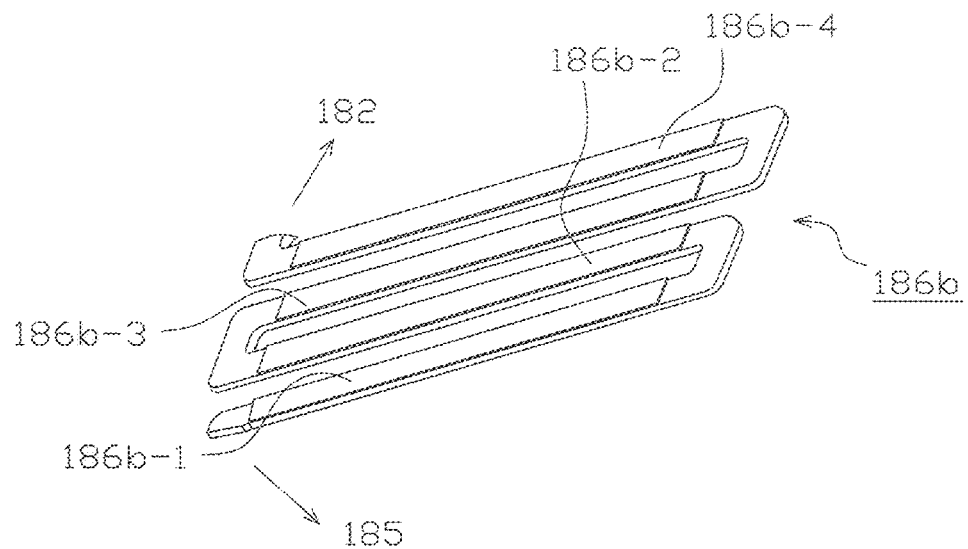
FIGS. 9A and 9B are perspective views for explaining a non-operation state and an operation state, respectively, of the piezoelectric cantilevers of one outer piezoelectric actuator of FIG. 7.
Figure 9B:
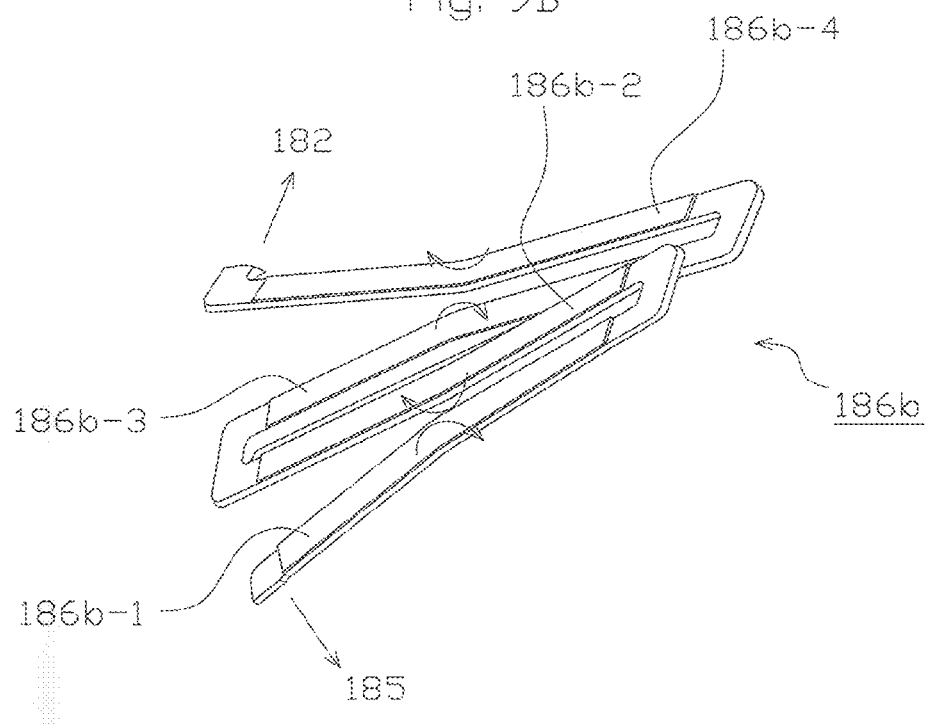

FIGS. 9A and 9B are perspective views for explaining the operation of the piezoelectric cantilevers of one outer piezoelectric actuator such as 186*b* of FIG. 7. Note that FIG. 9A illustrates a non-operation state of the piezoelectric cantilevers 186*b*-1, 186*b*-2, 186*b*-3 and 186*b*-4 of the piezoelectric actuator 186*b*, and FIG. 9B illustrates an operation state of the piezoelectric cantilevers 186*b*-1, 186*b*-2, 186*b*-3 and 186*b*-4 of the outer piezoelectric actuator 186*b*.

For example, as illustrated in FIG. 9B which illustrates only the piezoelectric cantilevers 186*b*-1, 186*b*-2, 186*b*-3 and 186*b*-4, when the odd-numbered group of the outer piezoelectric cantilevers 186*a*-1, 186*a*-3, 186*b*-1 and 186*b*-3 are flexed in one direction, for example, in a downward direction, the even-numbered group of the piezoelectric cantilevers 186*a*-2, 186*a*-4, 186*b*-2 and 186*b*-4 are flexed in the other direction, i.e., in an upward direction. On the other hand, when the odd-numbered group of the piezoelectric cantilevers 186*a*-1, 186*a*-3, 186*b*-1 and 186*b*-3 are flexed in the upward direction, the even-numbered group of the outer piezoelectric cantilevers 186*a*-2, 186*a*-4, 186*b*-2 and 186*b*-4 are flexed in the downward direction. Thus, the mirror 181 is rocked with respect to the Y-axis.

Note that the outer piezoelectric actuator 186a and 186b are of a non-resonant type. Therefore, the frequency of the curved-type saw-tooth drive voltages $V_{Y1}$ and $V_{Y2}$ is sufficiently small in order not to resonate with the natural frequency of a mechanically-vibrating system of the mirror 181 with respect to the Y-axis depending upon the piezoelectric cantilevers 186a-1, 186a-2, 186a-3 and 186a-4, 186b-1, 186b-2, 186b-3 and 186b-4.

The low-beam operation of the control circuit 19 of FIG. 7 is explained next with reference to FIGS. 10A to 10G, 11, 12, 13 and 14. This low-beam operation is selected when the low-beam switch 20L is turned ON. Also, in the low-beam operation, the cut-off boundary line CL is set on the horizontal line H on the left side of the vertical line V to prevent pedestrians from being dazzled and is set on a line lower than the horizontal line H on the right side of the vertical line V to prevent drivers of vehicles travelling in the opposite lane from being dazzled under the "keep to the left" system.

That is, the control circuit 19 applies a sinusoidal-wave drive voltage $V_{Xa}$ as illustrated in FIG. 10A based upon the drive data Xa stored in the nonvolatile memory 1911 via the pad $P_{Xa}$ to the upper electrode layers of the piezoelectric cantilevers 1841-a and 1842-a, and also, applies a sinusoidal-wave drive voltage $V_{Xb}$ as illustrated in FIG. 10B based upon the drive data Xb stored in the nonvolatile memory 1912 via the pad $P_{Xb}$ to the upper electrode layers of the piezoelectric cantilevers 1841-b and 1842-b. In this case, the sinusoidal-wave drive voltages $V_{Xa}$ and $V_{Xb}$ are symmetrical or opposite in phase to each other. As a result, the piezoelectric cantilevers 1841-a and 1841-b and the piezoelectric cantilevers 1842-a and 1842-b carry out flexing operations in opposite directions to each other, so that the torsion bars 1831 and 1832 are twisted to rock the mirror 181 with respect to the X-axis.

On the other hand, the control circuit 19 applies a curved-type saw-tooth drive voltage $V_{Y1}$ as illustrated in FIG. 10C based upon the low-beam drive data Y1L stored in the nonvolatile memory 1913 via the pad $P_{Y1a}$ and $P_{Y1b}$ to the upper electrode layers of the odd-numbered piezoelectric cantilevers 186a-1, 186a-3, 186b-1 and 186b-3, and also, the control circuit 19 applies a curved-type saw-tooth drive voltage $V_{Y2}$ as illustrated in FIG. 10D based upon the low-beam drive data Y2L stored in the nonvolatile memory 1914 via the pad $P_{Y2a}$ and $P_{Y2b}$ to the upper electrode layers of the even-numbered piezoelectric cantilevers 186a-2, 186a-4, 186b-2 and 186b-4. In this case, the curved-type saw-tooth drive voltages $V_{Y1}$ and $V_{Y2}$ are symmetrical and opposite in phase to each other. As a result, the piezoelectric cantilevers 186a-1, 186a-2, 186a-3 and 186a-4 and the piezoelectric cantilevers 186b-1, 186b-2, 186b-3 and 186b-4 carry out flexing operations to rock the mirror 181 with respect to the Y-axis.

The frequency $f_X$ of the drive voltages $V_{Xa}$ and $V_{Xb}$ is relatively high, while the frequency $f_Y$ of the drive voltages $V_{Y1}$ and $V_{Y2}$ is relatively low. For example, if $f_X/f_Y=960$, 480 scan lines $SL_1, SL_2, \ldots, SL_{480}$ are depicted by the illumination point P.

For each of the half periods Ta and Tb ($=T/2$), the curved-type saw-tooth drive voltages $V_{Y1}$ and $V_{Y2}$ are of a curved-type, i.e., the curved-type saw-tooth drive voltages $V_{Y1}$ and $V_{Y2}$ are first gradually changed and then, rapidly changed, or the curved-type saw-tooth drive voltages $V_{Y1}$ and $V_{Y2}$ are first rapidly changed and then, gradually changed. That is, for the former half period Ta for ascending the scan lines $SL_1$, $SL_2, \ldots, SL_{480}$, the curved-type saw-tooth drive voltage $V_{Y1}$ is first gradually increased and then, rapidly increased, and the curved-type saw-tooth drive voltage $V_{Y2}$ is first gradually decreased and then, rapidly decreased. On the other hand, for the latter half period Tb for descending the scan lines $SL_{480}$, $SL_{479}, \ldots, SL_1$, the curved-type saw-tooth drive voltage $V_{Y1}$ is first rapidly decreased and then, gradually decreased, and the curved-type saw-tooth drive voltage $V_{Y2}$ is first rapidly increased and then, gradually increased.

The drive voltages $V_{Y1}$ and $V_{Y2}$ and the inclination angle ρ have a linear relationship due to the meander-type outer piezoelectric actuators 186a and 186b. As a result, as illustrated in FIG. 10E, the inclination angle ρ is curved, i.e., the inclination angle ρ is first gradually changed and then, rapidly changed, or the inclination angle ρ is first rapidly changed and then, gradually changed. That is, for the former half period Ta, the inclination angle ρ is first gradually increased from ρ=0° and then, rapidly increased to ρ=$ρ_{m1}$. On the other hand, for the latter half period Tb, the inclination angle ρ is first rapidly decreased from ρ=$ρ_{m1}$ and then, gradually decreased to ρ=0°.

Figure 13:
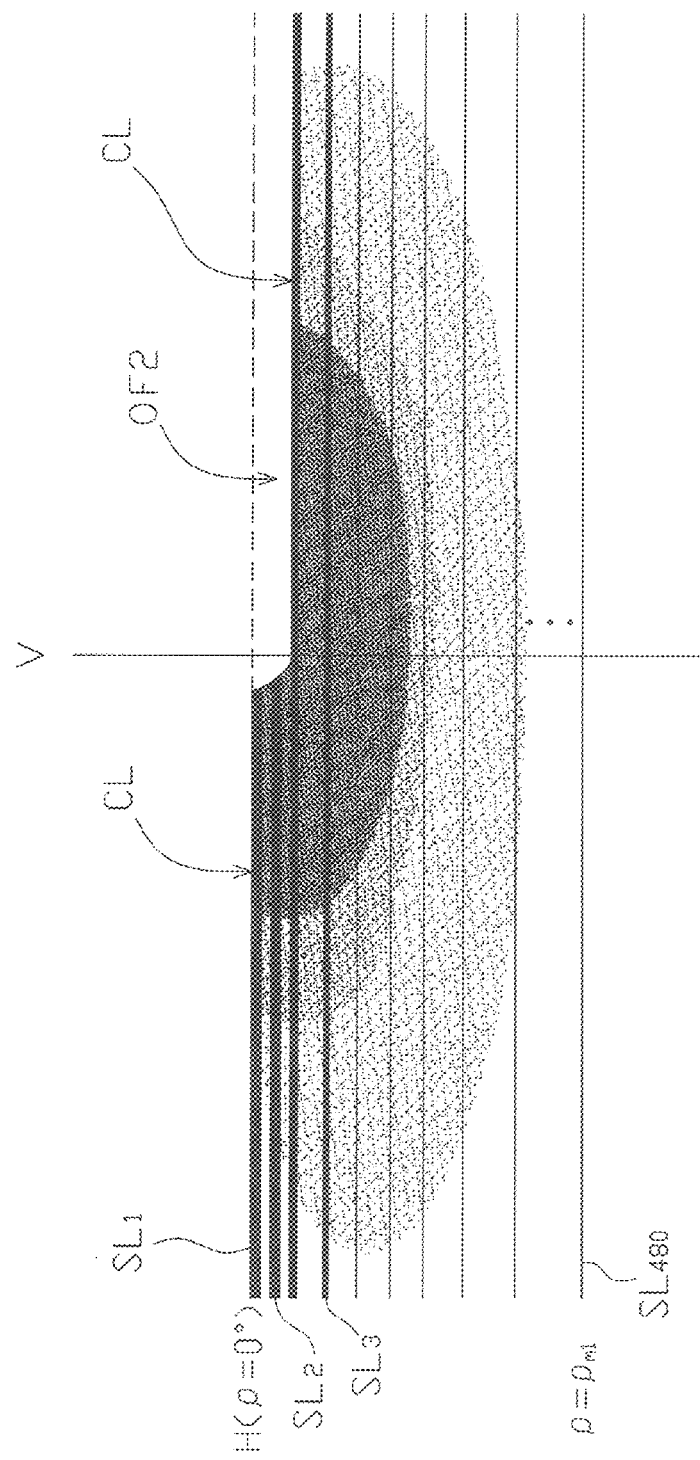
FIG. 13 is a diagram illustrating scan lines of the spotlight by the low-beam operation of FIGS. 10A, 10B, 10C, 10D, 10E, 10F and 10G.
Figure 14:
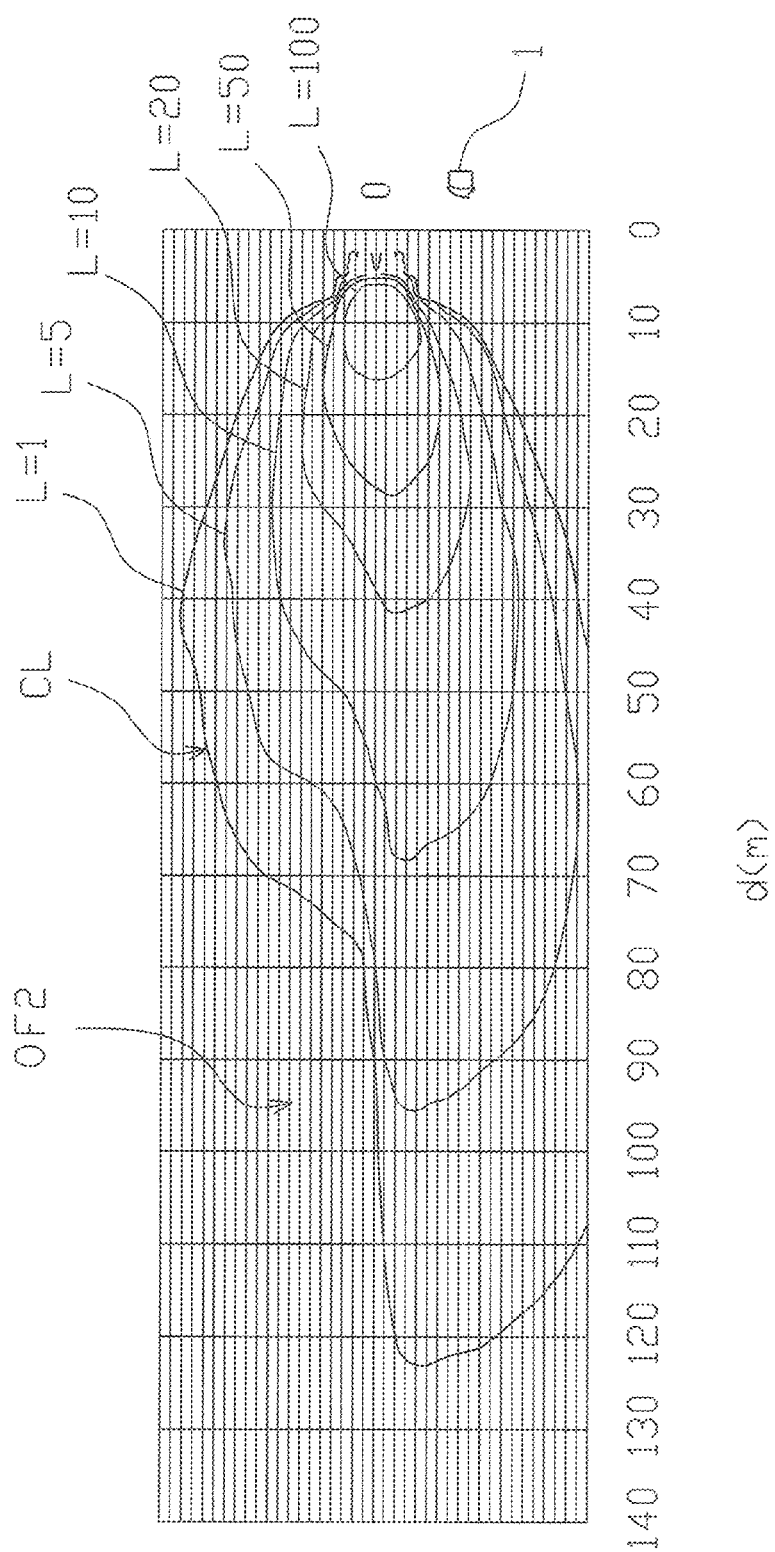
FIG. 14 is an isoluminance diagram obtained by the low-beam operation of FIGS. 10A, 10B, 10C, 10D, 10E, 10F and 10G.

The increasing and decreasing rates of the curved-type saw-tooth drive voltages $V_{Y1}$ and $V_{Y2}$, i.e., the decreasing and increasing of the inclination angle ρ are determined in such a way that the scan lines $SL_1, SL_2, \ldots, SL_{480}$ are nonuniform in the vertical line V as illustrated in FIG. 13. In more detail, in order to obtain regularity of illumination in the vicinity of the cut-off boundary line CL, the closer to the cut-off boundary line CL the scan lines $SL_1, SL_2, \ldots, SL_{480}$, the larger the density of the scan lines $SL_1, SL_2, \ldots, SL_{480}$.

Figure 11:
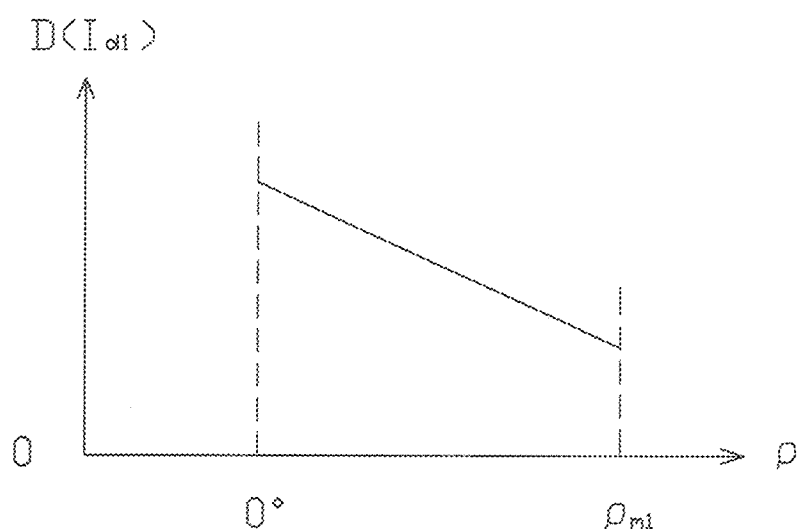
FIG. 11 is a graph illustrating the relationship between the inclination angle and the size of the spotlight of FIGS. 10E and 10F.

Even when the density of the scan lines $SL_1, SL_2, \ldots, SL_{480}$ in the vicinity of the cut-off boundary line CL is large, the scan lines $SL_1, SL_2, \ldots$ in the vicinity of the cut-off boundary line CL would still be clearly observed as lines. In order to obscure such lines, as illustrated in FIG. 10F, the size D ($I_{d1}$) of the spotlight S, i.e., the line width of the scan lines $SL_1, SL_2, \ldots, SL_{480}$ is changed in accordance with the curved-type saw-tooth drive voltages $V_{Y1}$ and $V_{Y2}$, i.e., the inclination angle ρ. Note that the size D of the spotlight S is controlled by the drive current $I_{d1}$ supplied from the control circuit 19. That is, the control circuit 19 supplies a drive current $I_{d1}$ corresponding to the size D of the spotlight S as illustrated in FIG. 10F based upon the low-beam scan line size data DL stored in the nonvolatile memory 1915 to the filament springs 173 of the lens actuator 17. In this case, the size D ($I_{d1}$) of the spotlight S, i.e., the line width of the scan lines $SL_1$, $SL_2, \ldots, SL_{480}$ and the inclination angle ρ have a monotonously-changed or linear relationship as illustrated in FIG. 11. This linear relationship can be represented by a curve or a combination of two or more straight lines. As a result, as illustrated in FIG. 10F, for the former half period Ta, the line width of the scan lines is first gradually decreased and then, rapidly decreased. On the other hand, for the latter half period Tb, the line width of the scan lines is first rapidly increased and then, gradually increased. That is, the smaller the inclination angle ρ, the larger the line width of the scan lines $SL_1$, $SL_2, \ldots, SL_{480}$. As a result, the scan lines $SL_1, SL_2, \ldots$ in the vicinity of the cut-off boundary line CL are superposed onto each other, although FIG. 13 does not show such scan lines.

Figure 12:
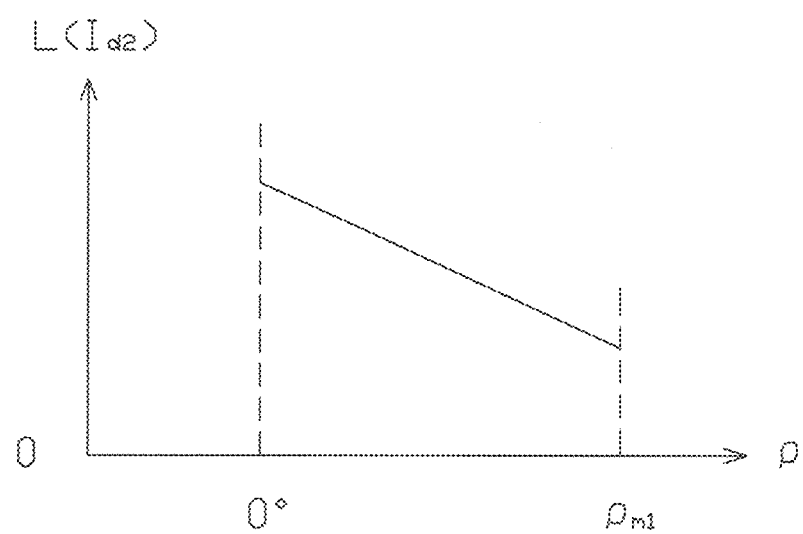
FIG. 12 is a graph illustrating the relationship between the inclination angle and the luminance of the spotlight of FIGS. 10E and 10G.

On the other hand, the larger the size D of the spotlight S or the line width of the scan lines, the smaller the luminance L of the spotlight S or the scan lines. Therefore, in order to obscure such lines more, as illustrated in FIG. 10G, the luminance L ($I_{d2}$) of the spotlight S, i.e., the luminance L of the scan lines $SL_1, SL_2, \ldots, SL_{480}$ is changed in accordance with the curved-type saw-tooth drive voltages $V_{Y1}$ and $V_{Y2}$, i.e., the inclination angle ρ. The luminance L of the spotlight S is controlled by the drive current $I_{d2}$ supplied from the control circuit 19. That is, the control circuit 19 supplies a drive current $I_{d2}$ corresponding to the luminance L of the spotlight S as illustrated in FIG. 10G based upon the low-beam scan line intensity data IL stored in the nonvolatile memory 1916 to the light source 15. In this case, the luminance L of the spotlight S, i.e., the luminance L of the scan lines $SL_1$, $SL_2, \ldots, SL_{480}$ and the inclination angle ρ have a monotonously-changed or linear relationship as illustrated in FIG. 12. This linear relationship can be represented by a curve or a combination of two or more straight lines. As a result, as illustrated in FIG. 10G, for the former half period Ta, the peak of the luminance L of the scan lines is first gradually decreased and then, rapidly decreased. On the other hand, for the latter half period Tb, the peak of the luminance L of the scan lines is first rapidly increased and then, gradually increased.

In FIG. 10G, the luminance L ($I_{d2}$) of each scan lines $SL_1$, $SL_2, \ldots, SL_{480}$ is sinusoidal. As a result, as illustrated in FIG. 13, the luminance L that is largest at a center portion in the horizontal line H can be realized as required for vehicles.

Also, as indicated by 0F1 in FIG. 10G, the latter half of the luminance L ($I_2$) of the scan lines such as $SL_1, SL_2, \ldots$ is zero. Therefore, as indicated by 0F2 in FIG. 13, in the low-beam operation, the cut-off boundary line CL on the right side with respect to the vertical line V is retarded as compared with the cut-off boundary line CL on the left side with respect to the vertical line V. Concretely, in FIG. 14, which is an isoluminance diagram by the low-beam operation of the headlamp 1 of FIGS. 3 and 4, if the cut-off boundary line CL is defined by the luminance L of 1 lx, the cut-off boundary line CL on the left side is retarded as compared with the cut-off boundary line CL on the right side.

Thus, irregularity of illumination in the vicinity of the cut-off boundary line CL in the low-beam operation can be avoided.

The high-beam operation of the control circuit 19 of FIG. 7 is explained next with reference to FIGS. 15A to 15G, 16, 17 and 18. This high-beam operation is selected when the high-beam switch 20H is turned ON. Also, in the high-beam operation, the cut-off boundary line CL is set above the horizontal line H on the both sides of the vertical line V.

Figure 15:
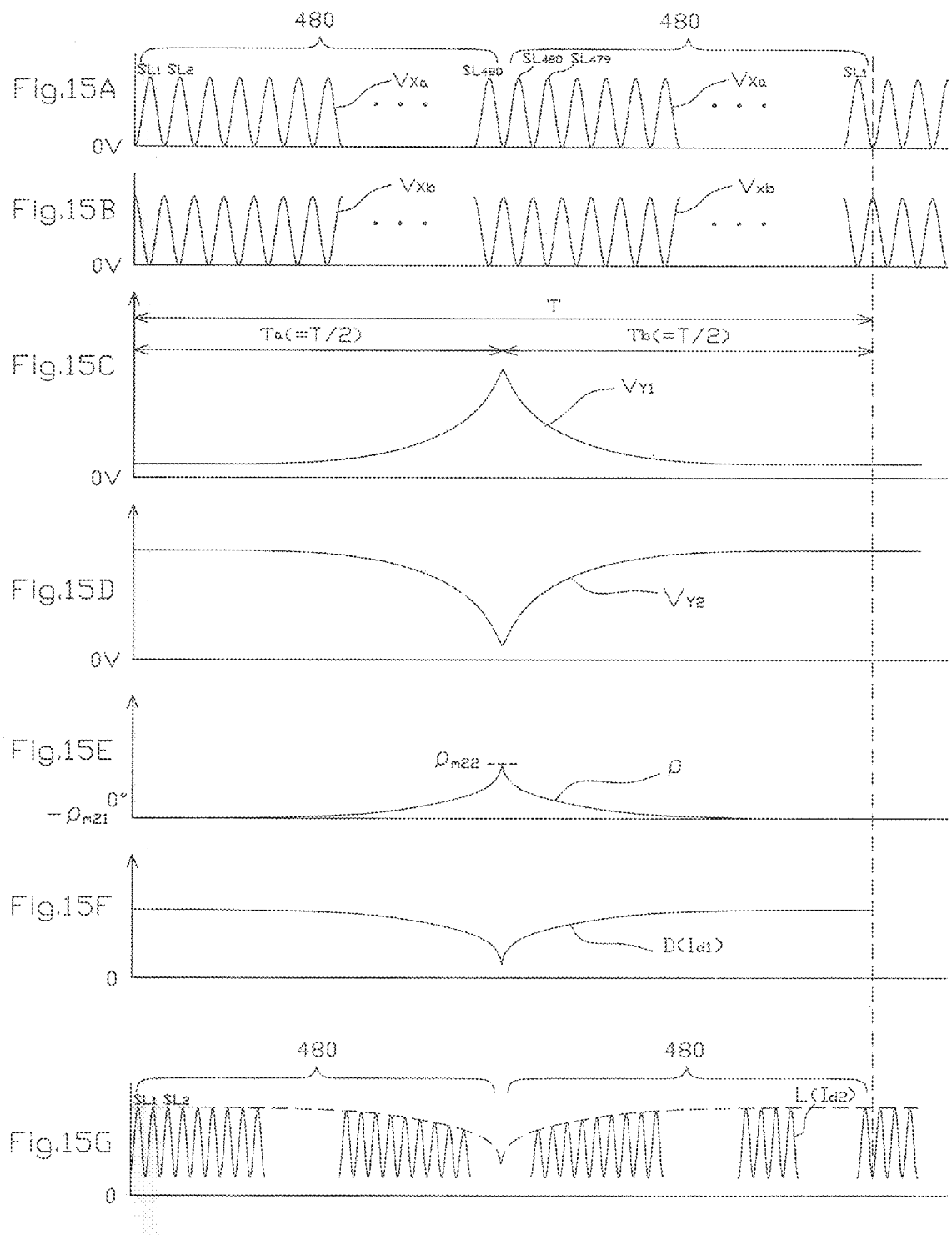
FIGS. 15A, 15B, 15C, 15D, 15E, 15F and 15G are timing diagrams for explaining the high-beam operation of the control circuit of FIG. 7.

That is, the control circuit 19 applies a sinusoidal-wave drive voltage $V_{Xa}$ as illustrated in FIG. 15A based upon the drive data Xa stored in the nonvolatile memory 1911 via the pad $P_{Xa}$ to the upper electrode layers of the piezoelectric cantilevers 1841-a and 1842-a, and also, applies a sinusoidal-wave drive voltage $V_{Xb}$ as illustrated in FIG. 15B based upon the drive data Xb stored in the nonvolatile memory 1912 via the pad $P_{Xb}$ to the upper electrode layers of the piezoelectric cantilevers 1841-b and 1842-b. Also, in this case, the sinusoidal-wave drive voltages $V_{Xa}$ and $V_{Xb}$ are symmetrical or opposite in phase to each other. As a result, the piezoelectric cantilevers 1841-a and 1841-b and the piezoelectric cantilevers 1842-a and 1842-b carry out flexing operations in opposite directions to each other, so that the torsion bars 1831 and 1832 are twisted to rock the mirror 181 with respect to the X-axis.

On the other hand, the control circuit 19 applies a curved-type saw-tooth drive voltage $V_{Y1}$ as illustrated in FIG. 15C based upon the high-beam drive data Y1H stored in the nonvolatile memory 1913 via the pad $P_{Y1a}$ and $P_{Y1b}$ to the upper electrode layers of the odd-numbered piezoelectric cantilevers 186a-1, 186a-3, 186b-1 and 186b-3, and also, the control circuit 19 applies a curved-type saw-tooth drive voltage $V_{Y2}$ as illustrated in FIG. 15D based upon the high-beam drive data Y2H stored in the nonvolatile memory 1914 via the pad $P_{Y2a}$ and $P_{Y2b}$ to the upper electrode layers of the even-numbered piezoelectric cantilevers 186a-2, 186a-4, 186b-2 and 186b-4. Also, in this case, the curved-type saw-tooth drive voltages $V_{Y1}$ and $V_{Y2}$ are symmetrical and opposite in phase to each other. As a result, the piezoelectric cantilevers 186a-1, 186a-2, 186a-3 and 186a-4 and the piezoelectric cantilevers 186b-1, 186b-2, 186b-3 and 186b-4 carry out flexing operations to rock the mirror 181 with respect to the Y-axis.

In FIGS. 15C and 15D, the curved-type saw-tooth drive voltages $V_{Y1}$ and $V_{Y2}$ are similar to those of FIGS. 10C and 10D; however, the curved-type saw-tooth drive voltages $V_{Y1}$ and $V_{Y2}$ are lower than those of FIGS. 10C and 10D.

The drive voltages $V_{Y1}$ and $V_{Y2}$ and the inclination angle ρ have a linear relationship due to the meander-type outer piezoelectric actuators 186a and 186b. As a result, as illustrated in FIG. 15E, the inclination angle ρ is curved, i.e., the inclination angle ρ is first definite, then gradually changed and finally, rapidly changed, or the inclination angle ρ is first rapidly changed, then, gradually changed, and finally, is definite. That is, for the former half period Ta, the inclination angle ρ is first definite, i.e., $\rho = \rho_{m21}$ where $\rho_{m21}$ is positive, then gradually increased from $\rho = -\rho_{m21}$ and finally, rapidly increased to $\rho = \rho_{m22}$. On the other hand, for the latter half period Tb, the inclination angle ρ is first rapidly decreased from $\rho = \rho_{m22}$, then, gradually decreased to $\rho = -\rho_{m21}$, and finally, is definite ($\rho = -\rho_{m21}$).

Figure 16:
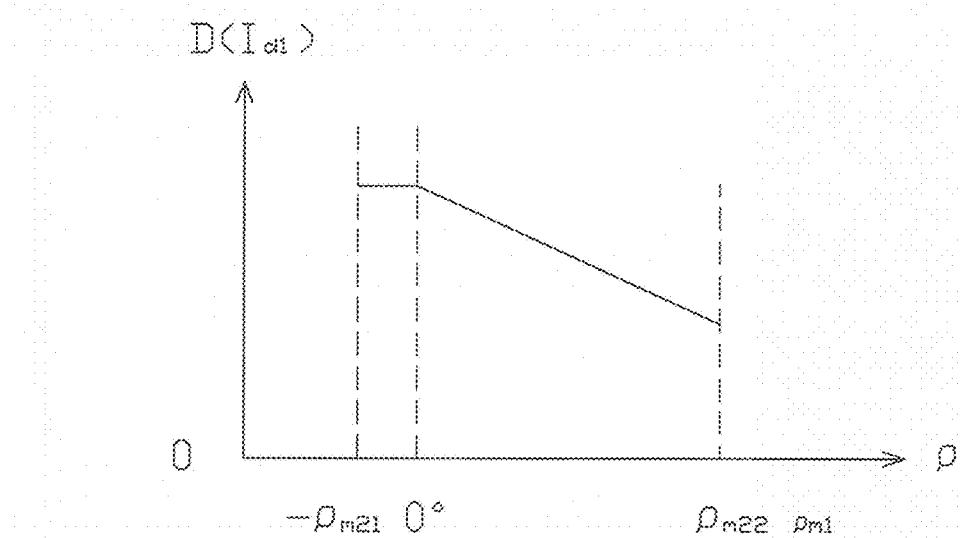
FIG. 16 is a graph illustrating the relationship between the inclination angle and the size of the spotlight of FIGS. 15E and 15F.

In order to obscure the scan lines, as illustrated in FIG. 15F, the size D ($I_{d1}$) of the spotlight S, i.e., the line width of the scan lines $SL_1, SL_2, \ldots SL_{480}$ is changed in accordance with the curved-type saw-tooth drive voltages $V_{Y1}$ and $V_{Y2}$, i.e., the inclination angle ρ. That is, the control circuit 19 supplies a drive current $I_{d1}$ corresponding to the size D of the spotlight S as illustrated in FIG. 15F based upon the high-beam scan line size data DH stored in the nonvolatile memory 1915 to the filament springs 173 of the lens actuator 17. In this case, the size D ($I_{d1}$) of the spotlight S, i.e., the line width of the scan lines $SL_1, SL_2, \ldots SL_{480}$ and the inclination angle ρ have a monotonously-changed or linear relationship as illustrated in FIG. 16 similar to FIG. 11, where the size D ($I_{d1}$) is definite when the inclination angle ρ is negative ($-\rho_{m21} \leq \rho < 0$). As a result, as illustrated in FIG. 15F, for the former half period Ta, the line width of the scan lines is first definite, then is gradually decreased, and finally, rapidly decreased. On the other hand, for the latter half period Tb, the line width of the scan lines is first rapidly increased and then, gradually increased, and finally, is definite. That is, the smaller the inclination angle ρ, the larger the line width of the scan lines $SL_1$, $SL_2, \ldots, SL_{480}$. Even in this case, the scan lines $SL_1$, $SL_2, \ldots$ in the vicinity of the cut-off boundary line CL are superposed onto each other, although FIG. 18 does not show such scan lines.

Figure 17:
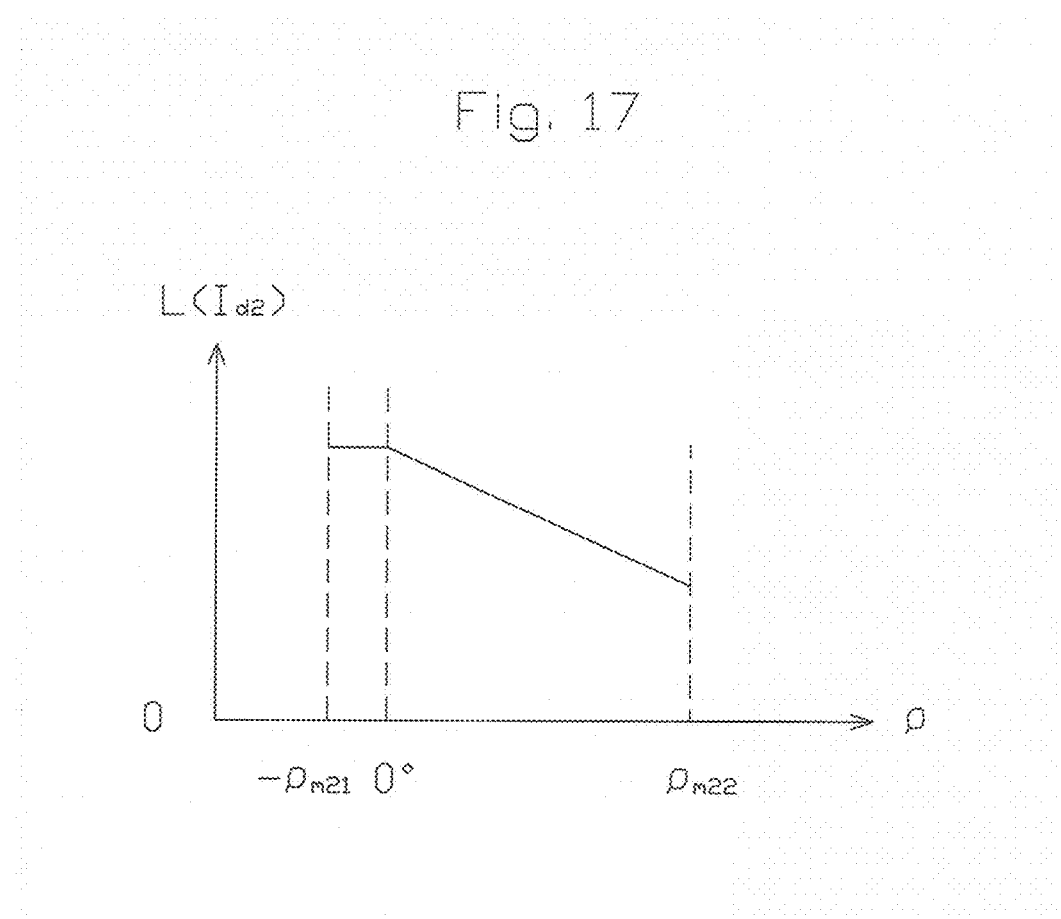
FIG. 17 is a graph illustrating the relationship between the inclination angle and the luminance of the spotlight of FIGS. 15E and 15G.

On the other hand, the larger the size D of the spotlight S or the line width of the scan lines, the smaller the luminance L of the spotlight S or the scan lines. Therefore, in order to morely obscure such lines, as illustrated in FIG. 15G, the luminance L ($I_{d2}$) of the spotlight S, i.e., the luminance L of the scan lines $SL_1, SL_2, \ldots, SL_{480}$ is changed in accordance with the curved-type saw-tooth drive voltages $V_{Y1}$ and $V_{Y2}$, i.e., the inclination angle ρ. Also, the luminance L of the spotlight S is controlled by the drive current $I_{d2}$ supplied from the control circuit 19. That is, the control circuit 19 supplies a drive current $I_{d2}$ corresponding to the luminance L of the spotlight S as illustrated in FIG. 10G based upon the high-beam scan line intensity data IH stored in the nonvolatile memory 1916 to the light source 15. In this case, the luminance L of the spotlight S, i.e., the luminance L of the scan lines $SL_1$, $SL_2, \ldots, SL_{480}$ and the inclination angle ρ have a linear relationship as illustrated in FIG. 17 similar to FIG. 12, where the luminance L ($I_{d2}$) is definite when the inclination angle ρ is negative ($-\rho_{m21} \leq \rho < 0$). As a result, as illustrated in FIG. 15G, for the former half period Ta, the peak value of the luminance L of the scan lines is first definite, then gradually decreased and finally, rapidly decreased. On the other hand, for the latter half period Tb, the peak value of the luminance L of the scan lines is first rapidly increased, then, gradually increased, and finally, is definite.

Figure 18:
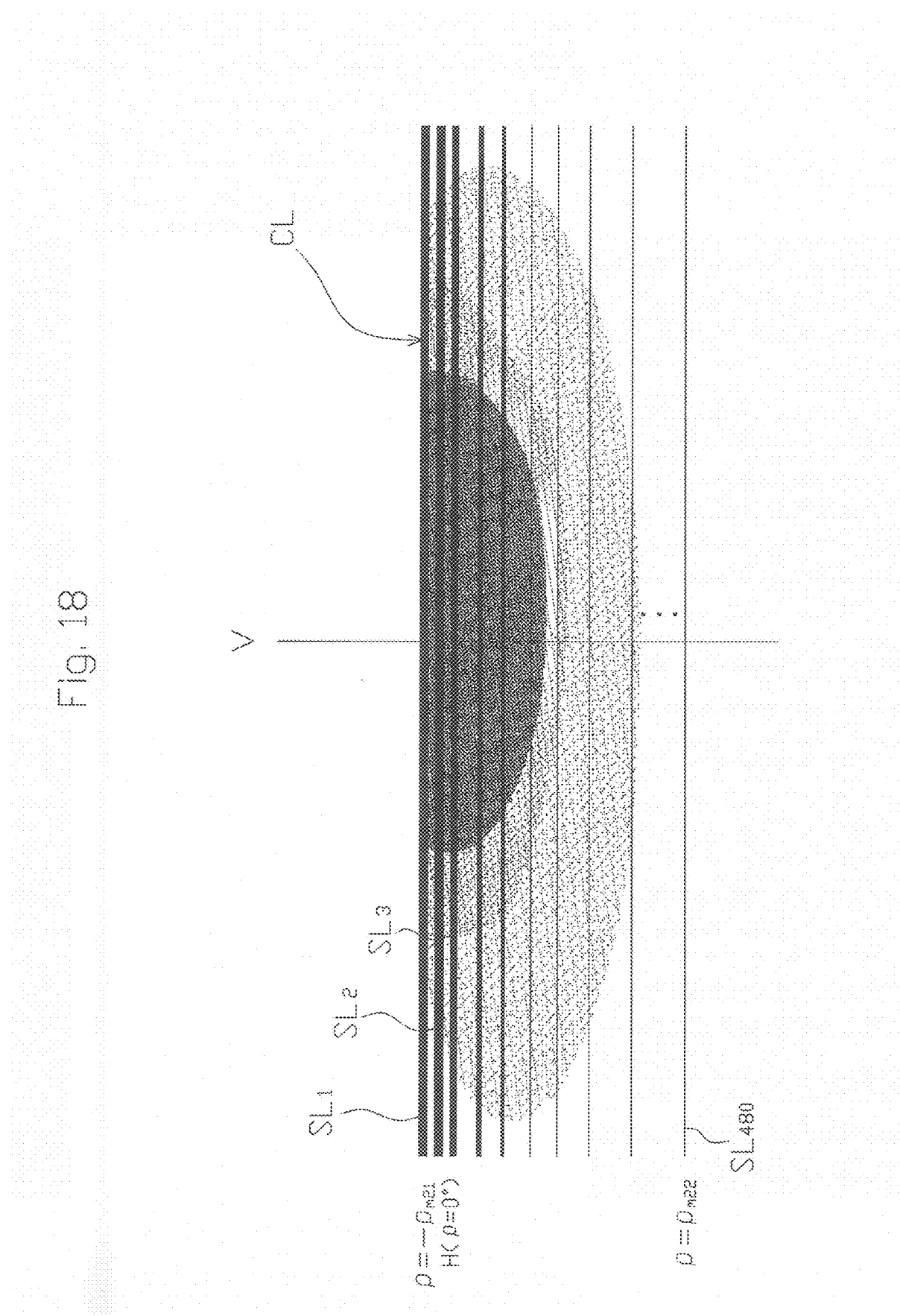
FIG. 18 is a diagram illustrating scan lines of the spotlight by the high-beam operation of FIGS. 15A, 15B, 15C, 15D, 15E, 15F and 15G.
Figure 19:
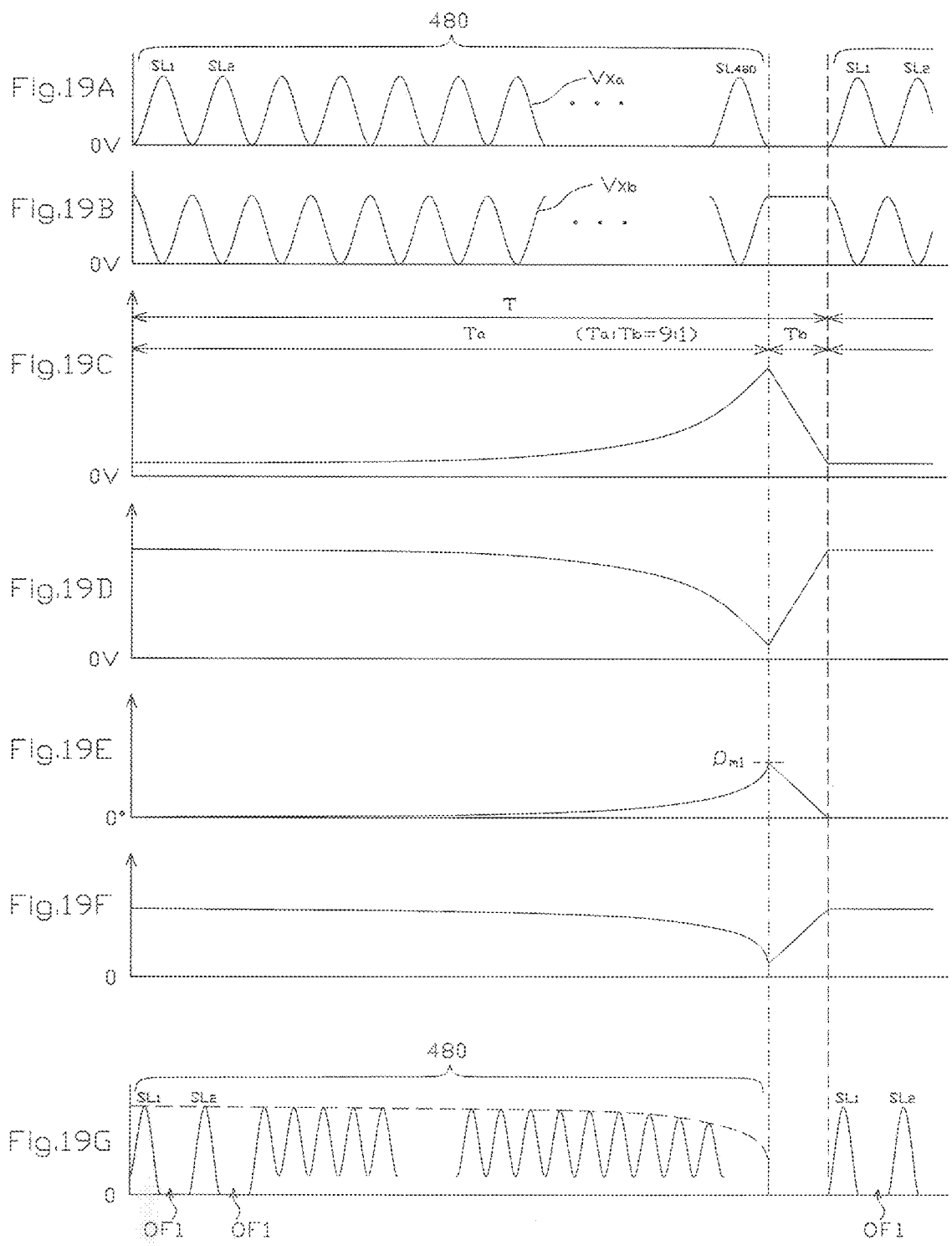
FIGS. 19A, 19B, 19C, 19D, 19E, 19F and 19G are other timing diagrams of modifications of FIGS. 10A, 10B, 10C, 10D, 10E, 10F and 10G, respectively.
Figure 20:
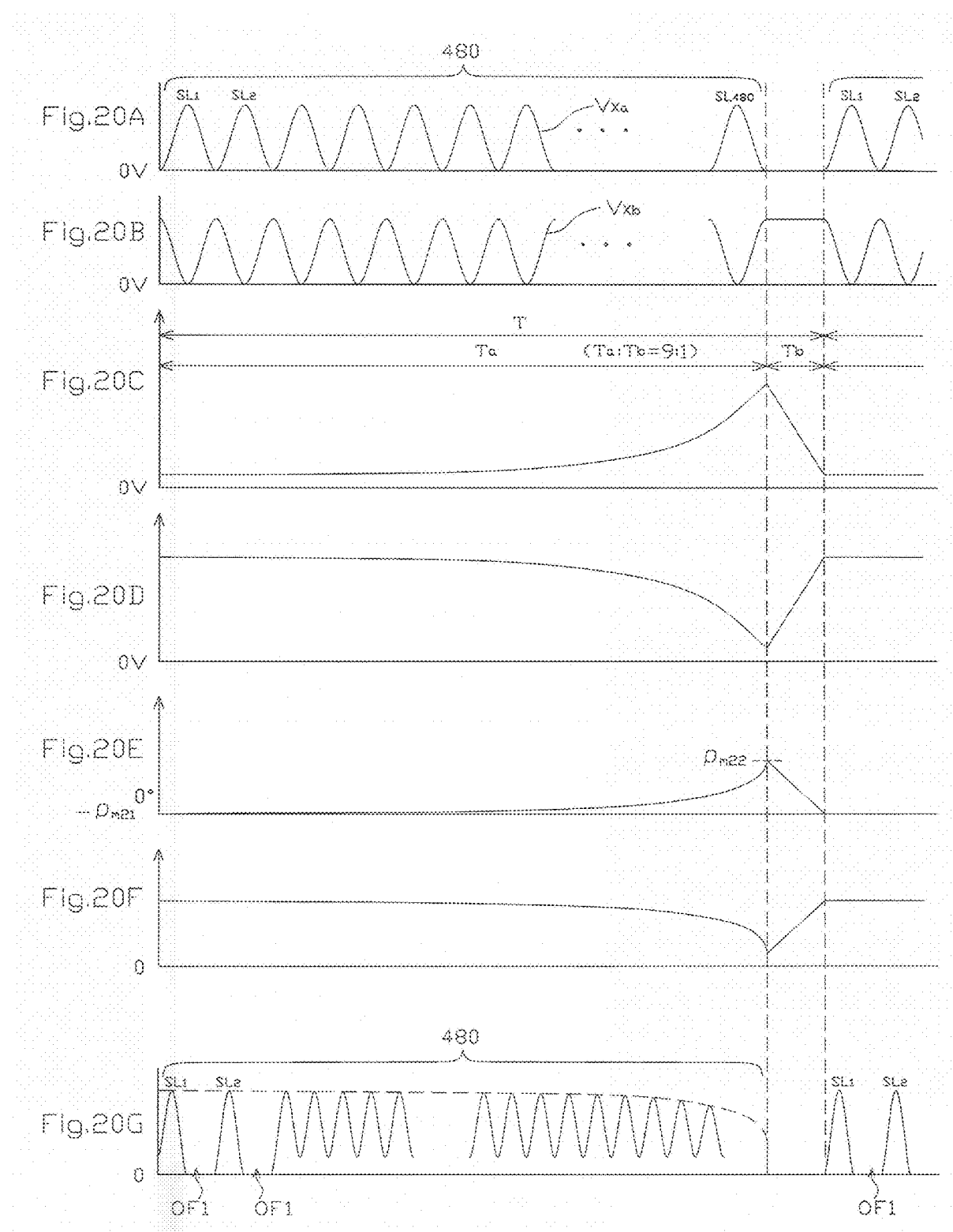
FIGS. 20A, 20B, 20C, 20D, 20E, 20F and 20G are other timing diagrams of modifications of FIGS. 15A, 15B, 15C, 15D, 15E, 15F and 15G, respectively.

Even in FIG. 15G, the luminance L ($I_{d2}$) of each scan lines $SL_1, SL_2, \ldots, SL_{480}$ is sinusoidal. As a result, as illustrated in FIG. 18, the luminance L is largest at a center portion in the horizontal line H can be realized as required for vehicles.

Thus, irregularity of illumination in the vicinity of the cut-off boundary line CL in the high-beam operation can be avoided.

In the above-described first example, although the frequency of the sinusoidal-wave drive voltages $V_{Xa}$ and $V_{Xb}$ is 960 times that of the curved-type drive voltages $V_{Y1}$ and $V_{Y2}$, a ratio of the frequency of the sinusoidal-wave drive voltages $V_{Xa}$ and $V_{Xb}$ to that of the curved-type drive voltages $V_{Y1}$ and $V_{Y2}$ may be larger than 1. Also, the frequency of the sinusoidal-wave drive voltages $V_{Xa}$ and $V_{Xb}$ for the former half period Ta may be different from the frequency of the sinusoidal-wave drive voltages $V_{Xa}$ and $V_{Xb}$ for the latter half period Tb.

In the above-described first example, the former half period Ta is the same as the latter half period Tb; however, the former half period Ta may be longer than the latter half period Tb, for example, Ta:Tb=9:1, as illustrated in FIGS. 19A through 19G corresponding to FIGS. 10A through 10G and FIGS. 20A through 20G corresponding to FIGS. 15A through 15G. In this case, the scan lines $SL_1, SL_2, \ldots SL_{480}$ are raised for the former half period Ta, and the light source 15 is turned OFF for the latter half period Tb to stop the horizontal scanning operation, which would complicate the control a little.

Figure 21:
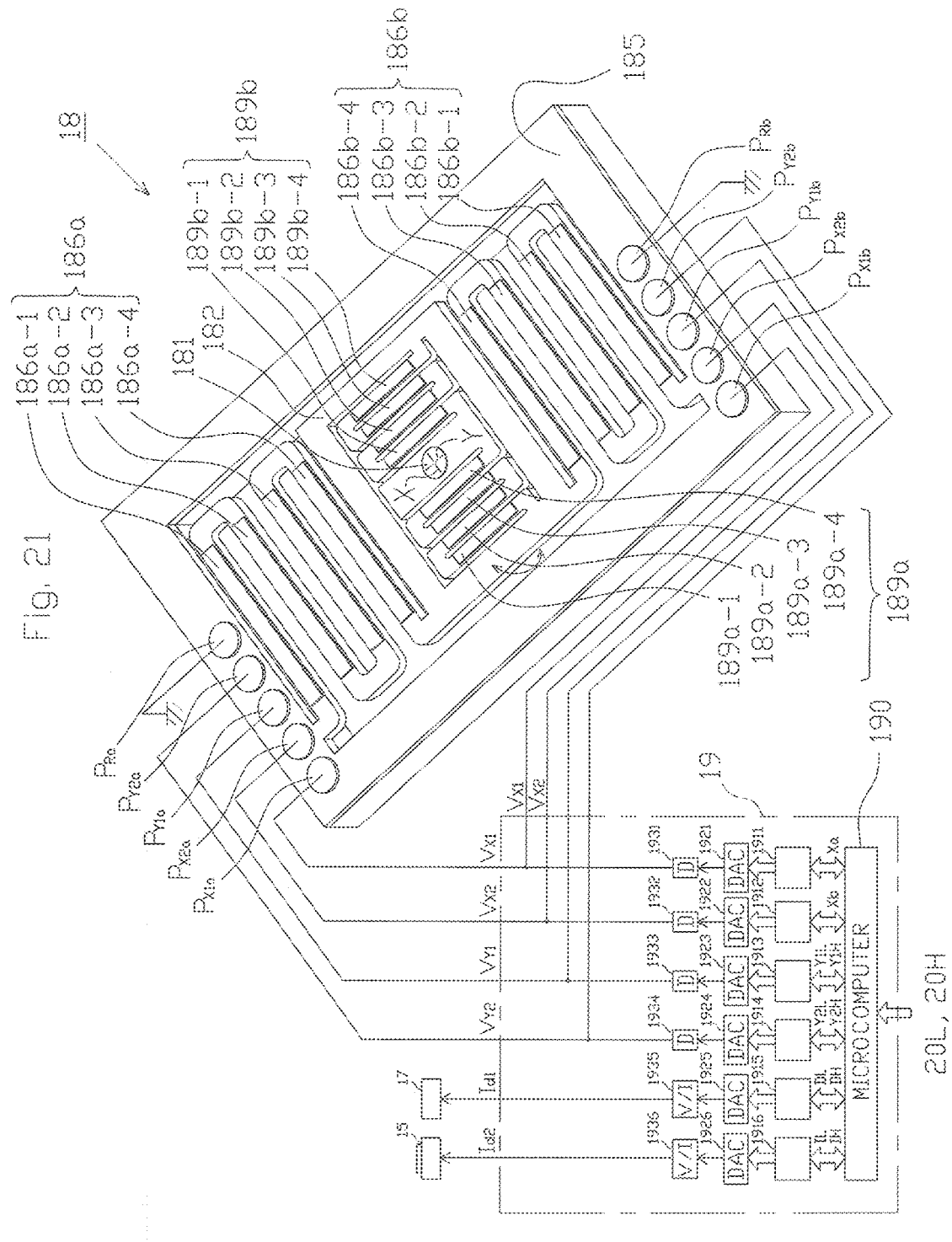
FIG. 21 is a detailed diagram of a second example of the optical deflector and the control circuit of FIGS. 3 and 4.

In FIG. 21, which is a detailed diagram of a second example of the optical deflector 18 and the control circuit 19 of FIGS. 3 and 4, inner piezoelectric actuators (first piezoelectric actuators) 189a and 189b of a meander type are provided instead of the torsion bars 1831 and 1832 and the inner piezoelectric actuators (first piezoelectric actuators) 1841 and 1842 of FIG. 7.

The inner piezoelectric actuator 189a is constructed by piezoelectric cantilevers 189a-1, 189a-2, 189a-3 and 189a-4; and 189b-1, 189b-2, 189b-3 and 189b-4 are coupled between the inner circumference of the movable frame 182 and the mirror 181, in order to rock the mirror 181 with respect to the X-axis.

The piezoelectric cantilevers 189a-1, 189a-2, 189a-3 and 189a-4 are serially-coupled from the movable frame 182 to the mirror 181. Also, each of the piezoelectric cantilevers 189a-1, 189a-2, 189a-3 and 189a-4 are in parallel with the Y-axis of the mirror 181. Therefore, the piezoelectric cantilevers 189a-1, 189a-2, 189a-3 and 189a-4 are folded at every cantilever or meandering from the support body 185 to the mirror 181, so that the amount of flexing of the piezoelectric cantilevers 189a-1, 189a-2, 189a-3 and 189a-4 can be changed along directions perpendicular to the Xiaxis of the mirror 181.

Similarly, the inner piezoelectric actuator 189b is constructed by piezoelectric cantilevers 189b-1, 189b-2, 189b-3 and 189b-4 are serially-coupled from the movable frame 182 to the mirror 181. Also, each of the piezoelectric cantilevers 189b-1, 189b-2, 189b-3 and 189b-4 are in parallel with the Y-axis of the mirror 181. Therefore, the piezoelectric cantilevers 189b-1, 189b-2, 189b-3 and 189b-4 are folded at every cantilever or meandering from the support body 185 to the mirror 181, so that the amount of flexing of the piezoelectric cantilevers 189b-1, 189b-2, 189b-3 and 189b-4 can be changed along directions perpendicular to the X-axis of the mirror 181.

Also, in FIG. 21, pads $P_{X1a}, P_{X2a}, P_{X1b}$ and $P_{X2b}$ are provided instead of the pads $P_{Xa}$ and $P_{Xb}$ of FIG. 7.

Figure 22:
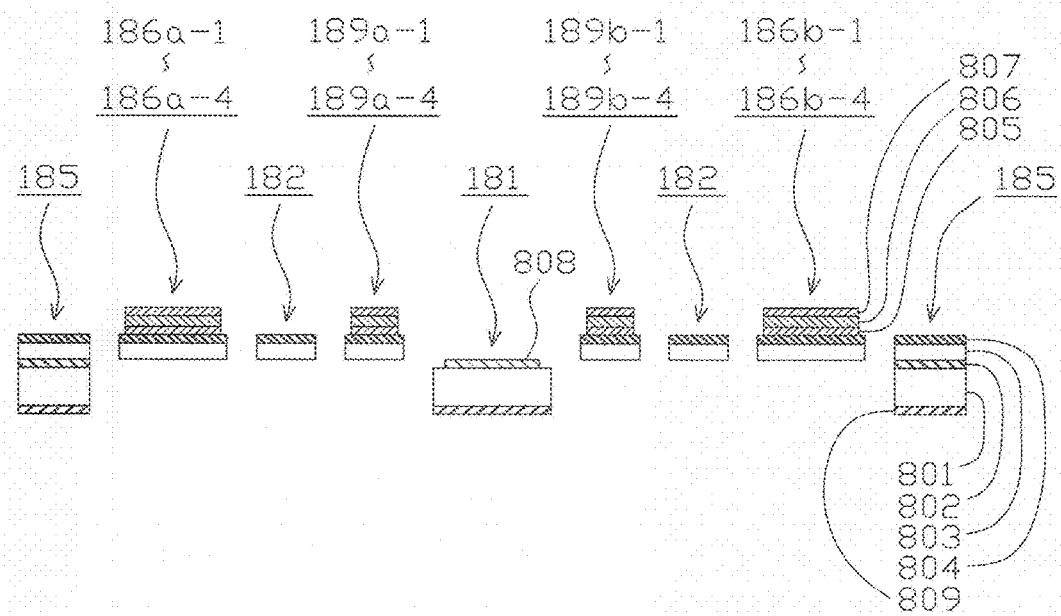
FIG. 22 is a cross-sectional view of the optical deflector of FIG. 21.

The pad $P_{X1a}$ is connected to the upper electrode layer 807 (see: FIG. 22) of each of the piezoelectric cantilevers 189a-1 and 189a-3, and the pad $P_{X2a}$ is connected to the upper electrode layer 807 (see: FIG. 22) of each of the piezoelectric cantilevers 189a-2 and 189a-4. Further, the pad $P_{Ra}$ is connected via via-plugs (not shown) to the lower electrode layer 805 (see: FIG. 22) of each of the piezoelectric cantilevers 189a-1, 189a-2, 189a-3 and 189a-4.

On the other hand, the pad $P_{X1b}$ is connected to the upper electrode layer 807 (see: FIG. 22) of each of the piezoelectric cantilevers 189b-1 and 189b-3, and the pad $P_{X2b}$ is connected to the upper electrode layer 807 (see: FIG. 22) of each of the piezoelectric cantilevers 189b-2 and 189b-4. Further, the pad $P_{Rb}$ is connected via via-plugs (not shown) to the lower electrode layer 805 (see: FIG. 22) of each of the piezoelectric cantilevers 189b-1, 189b-2, 189b-3 and 189b-4.

The drive circuit 1931 applies a straight-type saw-tooth drive voltage $V_{X1}$ to the pads $P_{X1a}$ and $P_{X1b}$. Also, the drive circuit 1932 applies a straight-type saw-tooth drive voltage $V_{X2}$ to the pads $P_{X2a}$ and $P_{X2b}$.

Note that the inner piezoelectric actuators 189a and 189b are of a non-resonated type. Therefore, the frequency of the straight-type saw-tooth drive voltages $V_{X1}$ and $V_{X2}$ is sufficiently small in order not to resonate with the natural frequency of a mechanically-vibrating system of the mirror 181 with respect to the X-axis depending upon the piezoelectric cantilevers 189a-1, 189a-2, 189a-3 and 189a-4, 189b-1, 189b-2, 189b-3 and 189b-4.

As illustrated in FIG. 22, which illustrates a cross-sectional view of the optical deflector of FIG. 21, the piezoelectric cantilevers 189a-1, 189a-2, 189a-3 and 189a-4, 189b-1, 189b-2, 189b-3 and 189b-4 are constructed by the monocrystalline silicon active layer 803, the silicon oxide layer 804, the lower electrode layer 805, the PZT layer 806 and the upper electrode layer 807.

An optical deflection or horizontal scanning operation by rocking the mirror 181 with respect to the X-axis is similar to the optical deflection or vertical scanning operation by rocking the mirror 181 with the Y-axis below.

The piezoelectric cantilevers 189a-1, 189a-2, 189a-3, 189a-4, 189b-1, 189b-2, 189b-3 and 189b-4 are divided into an odd-numbered group of the piezoelectric cantilevers 189a-1 and 189a-3; 189b-1 and 189b-3, and an even-numbered group of the piezoelectric cantilevers 189a-2 and 189a-4; 189b-2 and 189b-4 alternating with the odd-numbered group of the piezoelectric cantilevers 189a-1 and 189a-3; 189b-1 and 189b-3.

In the same way as the piezoelectric cantilevers 186a-1, 186a-2, 186a-3 and 186a-4; 186b-1, 186b-2, 186b-3 and 186b-4 of FIG. 7, when the odd-numbered group of the piezoelectric cantilevers 189a-1, 189a-3, 189b-1 and 189b-3 are flexed in one direction, for example, in a downward direction, the even-numbered group of the piezoelectric cantilevers 189a-2, 189a-4, 189b-2 and 189b-4 are flexed in the other direction, i.e., in an upward direction. On the other hand, when the odd-numbered group of the piezoelectric cantilevers 189a-1, 189a-3, 189b-1 and 189b-3 are flexed in the upward direction, the even-numbered group of the piezoelectric cantilevers 189a-2, 189a-4, 189b-2 and 189b-4 are flexed in the downward direction. Thus, the mirror 181 is rocked with respect to the X-axis.

The low-beam and high-beam operations of the control circuit 19 of FIG. 21 are carried out based upon the timing diagrams of FIGS. 23A, 23B, 23C, 23D, 23E, 23F and 23G, and FIGS. 24A, 24B, 24C, 24D, 24E, 24F and 24G corresponding to those of FIGS. 10A, 10B, 10C, 10D, 10E, 10F and 10G and FIGS. 15A, 15B, 15C, 15D, 15E, 15F and 15G.

That is, as illustrated in FIGS. 23A, 23B, 24A and 24B, a drive voltage $V_{X1}$ based upon the drive data X1 stored in advance in the nonvolatile memory 1911 and a drive voltage $V_{X2}$ based upon the drive data X2 stored in advance in the nonvolatile memory 1922 are straight-type saw-tooth-shaped at a predetermined frequency and symmetrical or opposite in phase to each other. As a result, the piezoelectric cantilevers 189a-1, 189a-3, 189b-1 and 189b-3 and the piezoelectric cantilevers 189a-2, 189a-4, 189b-2 and 189b-4 carry out flexing operations in opposite directions to each other, so as to rock the mirror 181 with respect to the X-axis.

The drive voltages $V_{y1}$ and $V_{y2}$, the inclination angle ρ, the drive currents $I_{d1}$ and $I_{d2}$ are the same or similar to those of FIGS. 10C, 10D, 10E, 10F and 10G and FIGS. 15C, 15D, 15E, 15F and 15G.

Also, the low-beam and high-beam operation of the control circuit 19 of FIG. 21 can be carried out based upon the timing diagrams of FIGS. 19A, 19B, 19C, 19D, 19E, 19F and 19G and FIGS. 20A, 20B, 20C, 20D, 20E, 20F and 20G except that the straight-type saw-tooth drive voltage $V_{X1}$ and $V_{X2}$ are used instead of the sinusoidal-wave drive voltage $V_{Xa}$ and $V_{Xb}$.

Figure 25:
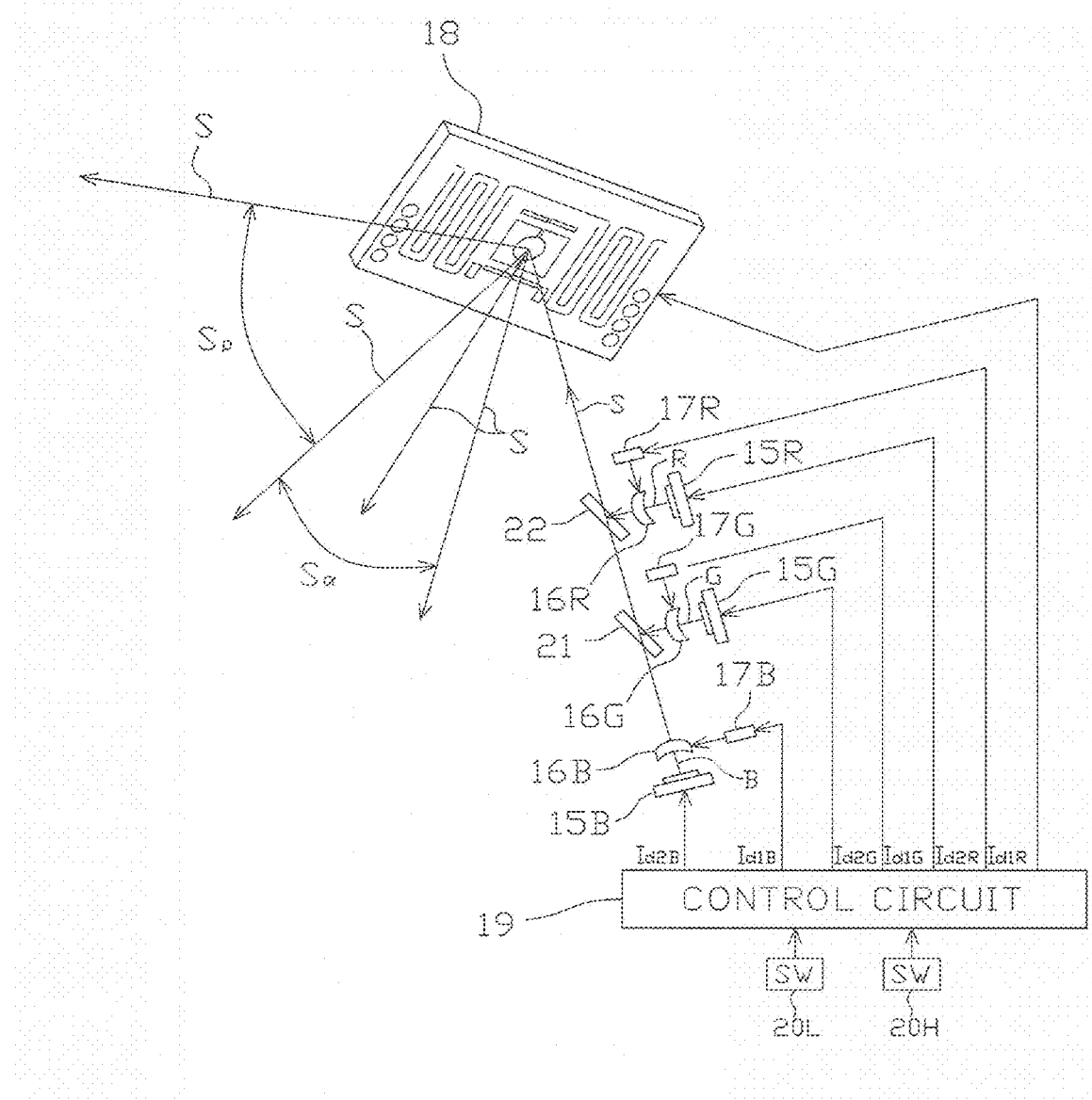
FIG. 25 is a perspective view illustrating a modification of the circuit of FIG. 4.

In FIG. 25, which illustrates a modification of the circuit of FIG. 4, the light source 15 formed by the white-color LED of FIG. 4 is replaced by a red laser diode 15R, a green laser diode 15G and a blue laser diode 15B. Also, three lenses 16R, 16G and 16B serving as the lens 16 of FIG. 4 are provided, and three lens actuators 17R, 17G and 17B serving as the lens actuator 17 of FIG. 4. Further, half mirrors 21 and 22 are provided in such a way that red light R, green light G and blue light B from the red laser diode 15R, the green laser diode 15G and the blue laser diode 15B, respectively, are combined and coincide with the optical axis A of the spotlight S.

Also, the sizes DR, DG and DB of the red light R, the green light G and the blue light B transmitted through the lenses 16R, 16G and 16B are controlled independently by supplying drive current $I_{d1R}$, $I_{d1G}$ and $I_{d1B}$ from the control circuit 19 thereto. Further, the luminances LR, LG and LB of the red light R, the green light G and the blue light B are controlled independently by supplying drive current $I_{d2R}$, $I_{d2G}$ and $I_{d2B}$ from the control circuit 19 thereto.

The control circuit 19 can control the laser diodes 15R, 15G and 15B and the lens actuators 17R, 17G and 17B in the same way as the control circuit 19 controls the light source 15 and the lens actuator 17 in FIG. 4. In addition, the control circuit 19 can control the laser diodes 15R, 15G and 15B independently and the lens actuators 17R, 17G and 17B separately.

In the above-described second example, note that the inner piezoelectric actuators 189a and 189b are of a non-resonant type. Therefore, the frequency of the straight-type saw-tooth drive voltages $V_{X1}$ and $V_{X2}$ is sufficiently small in order not to resonate with the natural frequency of a mechanically-vibrating system of the mirror 181 with respect to the X-axis depending upon the piezoelectric cantilevers 189a-1, 189a-2, 189a-3 and 189a-4, 189b-1, 189b-2, 189b-3 and 189b-4.

In the above-described first and second examples, note that the curved-type saw-tooth drive voltage $V_{y1}$ as illustrated in FIGS. 10C, 15C, 19C, 20C, 23C and 24C can be applied to the even-numbered group of the piezoelectric cantilevers 189a-2, 189a-4, 189b-2 and 189b-4, and the curved-type saw-tooth drive voltage $V_{y2}$ as illustrated in FIGS. 10D, 15D, 19D, 20D, 23D and 24D can be applied to the odd-numbered group of the piezoelectric cantilevers 189a-1, 189a-3, 189b-1 and 189b-3.

Figure 23:
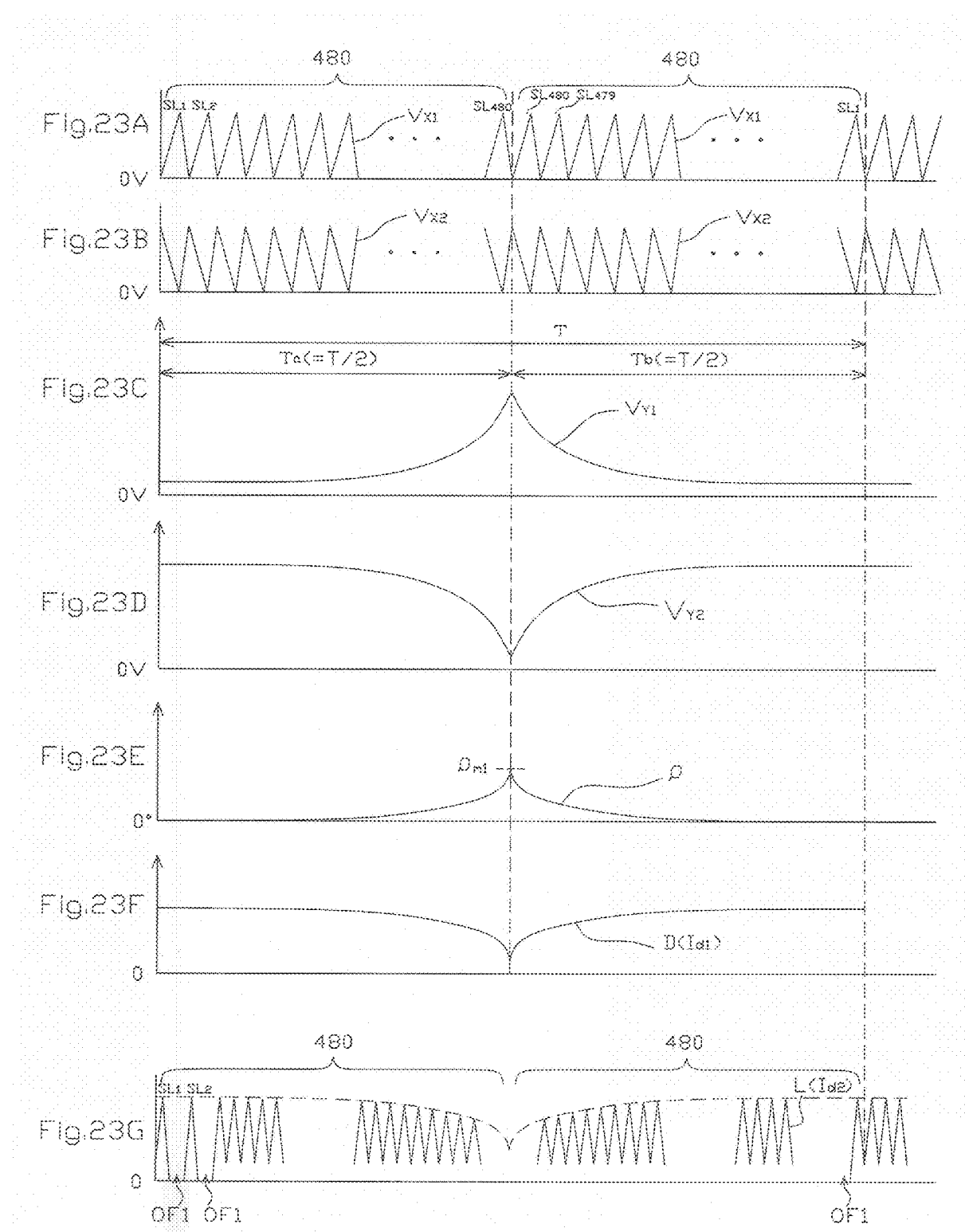
FIGS. 23A, 23B, 23C, 23D, 23E, 23F and 23G are timing diagrams for explaining the low-beam operation of the control circuit of FIG. 21.
Figure 24:
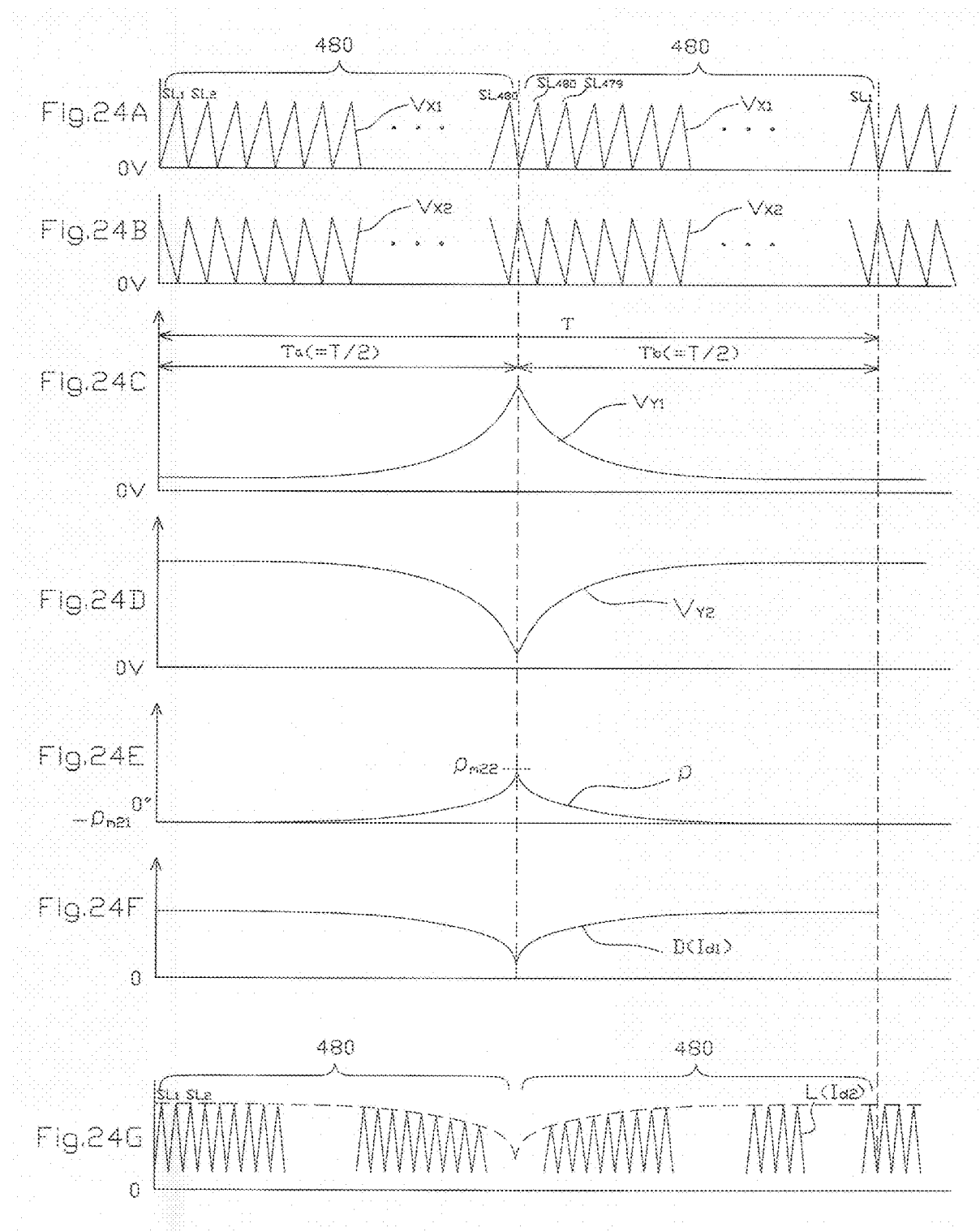
FIGS. 24A, 24B, 24C, 24D, 24E, 24F and 24G are timing diagrams for explaining the high-beam operation of the control circuit of FIG. 21.

Also, in the above-described second example, the straight-type saw-tooth drive voltage $V_{X1}$ as illustrated in FIGS. 23C and 24C can be applied to the even-numbered group of the piezoelectric cantilevers 189a-2, 189a-4, 189b-2 and 189b-4, and the straight-type saw-tooth drive voltage $V_{X2}$ as illustrated in FIGS. 23D and 24D can be applied to the odd-numbered group of the piezoelectric cantilevers 189a-1, 189a-3, 189b-1 and 189b-3.

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background section of the present specification are hereby incorporated in their entirety by reference.

The invention claimed is:

1. A headlamp for a vehicle comprising:
 a light source adapted to emit a spotlight;
 a lens adapted to receive and transmit said spotlight;
 a lens actuator adapted to adjust a size of said spotlight transmitted through said lens;
 a two-dimensional optical deflector adapted to deflect said spotlight from said lens to an illumination area ahead of said vehicle; and
 a control circuit configured to control said lens actuator in such a way that irregularity of illumination in said illumination area is avoided.

2. The headlamp as set forth in claim 1, wherein said control circuit is further configured to change the size of said spotlight in such a way that irregularity of illumination in the vicinity of a cut-off boundary line in said illumination area is avoided.

3. The headlamp as set forth in claim 1, wherein said lens actuator comprises:
 a frame;
 a holder supported by filament springs to said frame, said lens being fixed at said holder;
 a winding fixed at said holder and electrically connected to said filament springs; and
 a yoke fixed at said frame,
 said control circuit adapted to supply a drive current via said filament springs to said winding so as to control a distance between said light source and said lens.

4. The headlamp as set forth in claim 1, wherein said two-dimensional optical deflector comprises:
 a mirror adapted to reflect said spotlight;
 a movable frame;
 a first piezoelectric actuator fixed between said movable frame and said mirror, adapted to rock said mirror with respect to a first axis of said mirror;
 a support body;
 a second piezoelectric actuator fixed between said support body and said movable frame, adapted to rock said mirror with respect to a second axis of said mirror perpendicular to said first axis,
 said control circuit being configured to apply a first drive voltage to said first piezoelectric actuator and apply a second drive voltage to said second piezoelectric actuator, so that a plurality of scan lines are depicted by said spotlight in said illumination area,
 the closer to a cut-off boundary line said scan lines are, the larger a density of said scan lines.

5. The headlamp as set forth in claim 4, wherein said control circuit is configured to control said lens actuator to change the size of said spotlight defining a line width of said scan lines in accordance with said second drive voltage,
  the closer to said cut-off boundary line one of said scan lines is, the larger the line width of the one of said scan lines.

6. The headlamp as set forth in claim 5, wherein said control circuit is further configured to control said light source to change a luminance of said spotlight in accordance with said second drive voltage,
  the closer to said cut-off boundary line one of said scan lines is, the larger the luminance of said spotlight depicting the one of said scan lines.

7. The headlamp as set forth in claim 4, wherein said control circuit is configured to select a low-beam drive voltage and a high-beam drive voltage as said second drive voltage in response to turning ON of a low-beam switch and a high-beam switch, respectively, said low-beam drive voltage and said second drive voltage defining different cut-off boundary lines in said illumination area ahead of said vehicle.

8. The headlamp as set forth in claim 7, wherein said second piezoelectric actuator is of a meander type,
  said second drive voltage having one total period formed by a rising period and a falling period,
  said low-beam drive voltage first gradually changing and then, rapidly changing for one of said rising period and said falling period,
  said low-beam drive voltage first rapidly changing and then, gradually changing for the other one of said rising period and said falling period,
  said high-beam drive voltage first being definite, then, gradually changing and finally, rapidly changing for said one of said rising period and said falling period,
  said high-beam drive voltage first rapidly changing, then, gradually changing and finally, being definite for the other one of said rising period and said falling period.

9. The headlamp as set forth in claim 8, wherein each of said rising period and said falling period is half of said total period, said low-beam drive voltage and said high-beam drive voltage being symmetrical between said rising period and said falling period.

10. The headlamp as set forth in claim 7, wherein said second piezoelectric actuator is of a meander type,
  said second drive voltage having one total period formed by a rising period and a falling period, one of said rising period and said falling period being longer than the other,
  said low-beam drive voltage first gradually changing and then, rapidly changing for said one of said rising period and said falling period,
  said high-beam drive voltage first being definite, then, gradually changing and finally, rapidly changing for said one of said rising period and said falling period.

11. The headlamp as set forth in claim 10, wherein said control circuit is configured to turn OFF said light source for the other of said rising period and said falling period.

12. The headlamp as set forth in claim 7, wherein said second piezoelectric actuator is of a meander type,
  said second drive voltage having one total period formed by a rising period and a falling period, one of said rising period and said falling period being longer than the other,
  said low-beam drive voltage first rapidly changing and then, gradually changing for said one of said rising period and said falling period,
  said high-beam drive voltage first rapidly changing, then, gradually changing and finally, being definite for said one of said rising period and said falling period.

13. The headlamp as set forth in claim 12, wherein said control circuit is configured to turn OFF said light source for the other of said rising period and said falling period.

14. The headlamp as set forth in claim 4, wherein said first piezoelectric actuator is of a torsion-bar type,
  said control circuit being configured to generate a sinusoidal drive voltage and apply said sinusoidal drive voltage to said first piezoelectric actuator.

15. The headlamp as set forth in claim 14, wherein a frequency of said sinusoidal drive voltage is larger than a frequency of said second drive voltage.

16. The headlamp as set forth in claim 1, wherein said first piezoelectric actuator is of a meander type,
  said control circuit being configured to generate a straight-type saw-tooth drive voltage and apply said straight-type saw-tooth drive voltage to said first piezoelectric actuator.

17. The headlamp as set forth in claim 16, wherein a frequency of said straight-type saw-tooth drive voltage is larger than a frequency of said second drive voltage.

18. The headlamp as set forth in claim 1, wherein said light source comprises a plurality of different color light source units,
  said lens comprising a plurality of lens units adapted to receive and transmit lights from said color light source units,
  said lens actuator comprising a plurality of lens actuator units adapted to adjust sizes of said lights from said lens units,
  said headlamp further comprising half mirrors adapted to combine said lights from said lens units into said spotlight.

* * * * *